US006573983B1

(12) United States Patent
Laskowski

(10) Patent No.: US 6,573,983 B1
(45) Date of Patent: Jun. 3, 2003

(54) APPARATUS AND METHOD FOR PROCESSING BANK NOTES AND OTHER DOCUMENTS IN AN AUTOMATED BANKING MACHINE

(75) Inventor: Edward L. Laskowski, Seven Hills, OH (US)

(73) Assignee: Diebold, Incorporated, North Canton, OH (US)

( * ) Notice: Subject to any disclaimer, the term of this patent is extended or adjusted under 35 U.S.C. 154(b) by 283 days.

(21) Appl. No.: 09/633,486

(22) Filed: Aug. 7, 2000

Related U.S. Application Data

(63) Continuation-in-part of application No. 09/135,384, filed on Aug. 17, 1998, now Pat. No. 6,101,266, which is a continuation-in-part of application No. 08/749,260, filed on Nov. 15, 1996, now Pat. No. 5,923,413.

(51) Int. Cl.[7] .................................................. G06K 9/74
(52) U.S. Cl. ......................... 356/71; 356/394; 356/430; 356/431; 356/435
(58) Field of Search .......................... 356/71, 394, 430, 356/431, 432, 433, 435; 250/555, 556

(56) References Cited

U.S. PATENT DOCUMENTS

| | | | |
|---|---|---|---|
| 3,496,370 | A | 2/1970 | Haville et al. |
| 3,782,543 | A | 1/1974 | Martelli et al. |
| 4,023,011 | A | 5/1977 | Nakajama et al. |
| 4,147,430 | A | 4/1979 | Gorgone |
| 4,159,054 | A | 6/1979 | Yoshida |
| 4,163,570 | A | 8/1979 | Greenaway |
| 4,176,783 | A | 12/1979 | Eppich |
| 4,179,685 | A | 12/1979 | O'Maley |
| 4,183,665 | A | 1/1980 | Iannandrea |
| 4,187,463 | A | 2/1980 | Kivenson |
| 4,204,765 | A | 5/1980 | Iannandrea |
| 4,211,918 | A | 7/1980 | Nyfeler |
| 4,234,844 | A | 11/1980 | Yuki |

(List continued on next page.)

FOREIGN PATENT DOCUMENTS

| | | |
|---|---|---|
| DE | 3621095 | 9/1987 |
| JP | 7-172629 | 7/1995 |
| JP | 8-055255 | 2/1996 |

*Primary Examiner*—Frank G. Font
*Assistant Examiner*—Roy M. Punnoose
(74) *Attorney, Agent, or Firm*—Ralph E. Jocke; Daniel D. Wasil; Walker & Jocke

(57) ABSTRACT

An apparatus and method for determining a type and/or a condition of a note passing through the apparatus includes a note transport (12) which moves the note past sensing assemblies (18). Each sensing assembly includes emitters (32). Each of the emitters produces radiation at a different wavelength. The sensing assemblies include a reflectance detector (20) and a transmission detector (22) which are disposed on opposed sides of the passing note. The emitters direct radiation onto test spots (34) on the passing note. Reflectance values are generated from radiation reflected from each type of emitter to the reflectance detector. Transmission values are generated from radiation transmitted from an emitter through each test spot to the transmission detector. A control circuit produces a sensed value set including the reflectance and transmission values from each of the emitters in each of the sensing assemblies. The control circuit also determines an angle of skew of the passing note. Memories (138) include templates of values corresponding to transmission and reflectance values for known note types in a number of note positions. The control circuit generates stored value sets from the templates and skew angle. The control circuit further calculates a value representative of a level of correlation between the sensed value set and each of the stored value sets. The control circuit determines the highest level of correlation between all the stored value sets which is indicative of the note type and/or a condition thereof Various types of sensing assemblies can be used including sensing assemblies that are also suitable for capturing image data from notes or instruments processed in an automated banking machine.

43 Claims, 12 Drawing Sheets

U.S. PATENT DOCUMENTS 4,255,057 A 3/1981 Williams
4,255,652 A 3/1981 Weber
4,277,774 A 7/1981 Fujii
4,283,708 A 8/1981 Lee
4,288,781 A 9/1981 Sellner
4,302,781 A 11/1981 Ikeda
4,309,602 A 1/1982 Gonsalves
4,311,914 A 1/1982 Huber
4,319,137 A 3/1982 Nakamura
4,348,656 A 9/1982 Gorgone
4,349,111 A 9/1982 Shah
4,352,988 A 10/1982 Ishida
4,355,300 A 10/1982 Weber
4,383,275 A 5/1983 Sasaki
4,386,432 A 5/1983 Nakamura
4,399,553 A 8/1983 Toyama
4,429,991 A 2/1984 Williams
4,435,834 A 3/1984 Pauli
4,442,541 A 4/1984 Finkel
4,461,028 A 7/1984 Okubo
4,464,786 A 8/1984 Nishito
4,464,787 A 8/1984 Fish
4,465,925 A 8/1984 Goi
4,472,627 A 9/1984 Weinberger
4,482,058 A 11/1984 Steiner
4,486,098 A 12/1984 Buchegger
4,487,306 A 12/1984 Nao
4,490,846 A 12/1984 Ishida
4,500,002 A 2/1985 Koshio
4,501,439 A 2/1985 Antes
4,504,084 A 3/1985 Jauch
4,513,439 A 4/1985 Gorgone
4,514,085 A 4/1985 Kaye
4,524,276 A 6/1985 Ohtombe
4,537,504 A 8/1985 Baltes
4,538,719 A 9/1985 Gray
4,539,702 A 9/1985 Oka
4,542,829 A 9/1985 Emery
4,546,869 A 10/1985 Dean
4,550,433 A 10/1985 Takahashi
4,556,140 A 12/1985 Okada
4,558,224 A 12/1985 Gober
4,563,771 A 1/1986 Gorgone
4,572,349 A 2/1986 Furuya
4,584,529 A 4/1986 Aoyama
4,587,412 A 5/1986 Apisdorf
4,587,434 A 5/1986 Roes
4,588,292 A 5/1986 Collins
4,591,799 A 5/1986 Faillon
4,592,090 A 5/1986 Curl
4,618,257 A 10/1986 Bayne
4,628,194 A 12/1986 Dobbins
4,645,936 A 2/1987 Gorgone
4,652,015 A 3/1987 Crane
4,653,647 A 3/1987 Hashimoto
4,659,112 A 4/1987 Reiner
4,660,705 A 4/1987 Kai
4,677,682 A 6/1987 Miyagawa
4,678,072 A 7/1987 Kobayashi
4,700,368 A 10/1987 Munn
4,723,072 A 2/1988 Naruse
4,731,663 A 3/1988 Kovalchick
4,733,308 A 3/1988 Nakamura
4,749,074 A 6/1988 Ueki
4,749,087 A 6/1988 Buttifant
4,754,862 A 7/1988 Rawicz-Szczerbo
4,761,205 A 8/1988 Crane
4,794,585 A 12/1988 Lee
4,809,837 A 3/1989 Hayashi
4,823,393 A 4/1989 Kawakami
4,827,531 A 5/1989 Milford
4,834,230 A 5/1989 Kondo
4,837,840 A 6/1989 Goldman
4,850,468 A 7/1989 Kobayashi
4,858,744 A 8/1989 Dolejs
4,864,238 A 9/1989 Seitz
4,880,096 A 11/1989 Kobayashi
4,881,268 A 11/1989 Uchida
4,884,671 A 12/1989 Gardellini
4,896,901 A 1/1990 Ekelund
4,906,829 A 3/1990 Iseli
4,908,516 A 3/1990 West
4,922,109 A 5/1990 Bercovitz
4,922,110 A 5/1990 Melcher et al.
4,947,441 A 8/1990 Hara
4,966,304 A 10/1990 Kelly
4,973,851 A 11/1990 Lee
4,980,569 A 12/1990 Crane
4,996,604 A 2/1991 Ogawa
5,004,327 A 4/1991 Rosen
5,007,520 A 4/1991 Harris
5,010,243 A 4/1991 Fukushima
5,027,415 A 6/1991 Hara
5,034,616 A 7/1991 Bercovitz
5,044,707 A 9/1991 Mallik
5,047,871 A 9/1991 Meyer
5,063,163 A 11/1991 Carmeli
5,068,519 A 11/1991 Bryce
5,076,441 A 12/1991 Gerlier
5,099,975 A 3/1992 Ullman
5,101,184 A 3/1992 Antes
5,122,754 A 6/1992 Gotaas
5,151,607 A 9/1992 Crane
5,167,313 A 12/1992 Dobbins
5,199,543 A 4/1993 Kamagami
5,201,395 A 4/1993 Takizawa
5,210,398 A 5/1993 Metlitsky
5,222,584 A 6/1993 Zouzoulas
5,231,462 A 7/1993 Dschen
5,237,164 A 8/1993 Takada
5,242,041 A 9/1993 Isobe
5,259,490 A 11/1993 Gardellini
5,260,582 A 11/1993 Danek
5,267,753 A 12/1993 Chock
5,276,396 A 1/1994 Seitz
5,279,403 A 1/1994 Harbaugh
5,280,333 A 1/1994 Wunderer
5,283,422 A 2/1994 Storch
5,295,196 A 3/1994 Raterman
5,301,786 A 4/1994 Yoshihara
5,304,813 A 4/1994 De Man
5,308,992 A * 5/1994 Crane et al. ................ 250/556
5,315,511 A 5/1994 Matsuura
5,330,041 A 7/1994 Dobbins
5,341,408 A 8/1994 Melcher et al.
5,367,577 A 11/1994 Gotaas
5,374,825 A 12/1994 Doty
5,377,805 A 1/1995 Ono
5,381,019 A 1/1995 Sato
5,390,003 A 2/1995 Yamaguchi
5,393,556 A 2/1995 Romano
5,394,969 A 3/1995 Harbaugh
5,399,874 A 3/1995 Gonsalves
5,405,131 A 4/1995 Zouzoulos
5,407,191 A 4/1995 Ukai
5,411,249 A 5/1995 Zouzoulas
5,411,436 A 5/1995 Kaplan
5,416,307 A 5/1995 Danek
5,417,316 A 5/1995 Harbaugh
5,419,423 A 5/1995 Ishida
5,419,424 A 5/1995 Harbaugh 5,420,406 A 5/1995 Izawa
5,421,443 A 6/1995 Hatamachi
5,427,036 A 6/1995 Fee
5,427,462 A 6/1995 Jackson
5,430,664 A 7/1995 Cargill
5,432,506 A 7/1995 Chapman
5,434,427 A 7/1995 Crane
5,437,357 A 8/1995 Ota
5,437,897 A 8/1995 Tanaka
5,438,403 A 8/1995 Hoshino
5,443,144 A 8/1995 Dobbins
5,450,937 A 9/1995 Ono
5,462,149 A 10/1995 Waine
5,467,405 A 11/1995 Raterman
5,467,406 A 11/1995 Graves
5,468,971 A 11/1995 Ebstein
5,476,169 A 12/1995 Takarada
5,547,061 A * 8/1996 Itako et al. ................. 194/203
5,568,251 A * 10/1996 Davies et al. ................. 356/71
5,598,006 A * 1/1997 Stringa ....................... 250/556
5,633,949 A 5/1997 Graves et al.
5,652,802 A 7/1997 Graves et al.
5,687,963 A 11/1997 Mennie
5,692,067 A 11/1997 Raterman et al.
5,724,438 A 3/1998 Graves
5,751,840 A 5/1998 Raterman et al.
5,790,245 A * 8/1998 Kanesashi ................... 356/394
5,790,693 A 8/1998 Graves et al.
5,790,697 A 8/1998 Munro et al.
5,815,592 A 9/1998 Mennie et al.
5,822,448 A 10/1998 Graves et al.
5,832,104 A 11/1998 Graves et al.
5,867,589 A 2/1999 Graves et al.
5,870,487 A 2/1999 Graves et al.
5,875,259 A 2/1999 Mennie et al.
5,903,339 A * 5/1999 Levasseur ................... 250/555
5,922,959 A 7/1999 Kayani
5,923,413 A 7/1999 Laskowski

* cited by examiner $$c_{x,y} = \frac{\sum (X_i - \mu_x)(y_i - \mu y)}{\sigma_x \; \sigma_y}$$

94

| SCAN | GREEN REFL | | | RED REFL | | | BLUE REFL | | | IR REFL | | | GREEN TRANS | | | RED TRANS | | | BLUE TRANS | | | IR TRANS | | |
|---|---|---|---|---|---|---|---|---|---|---|---|---|---|---|---|---|---|---|---|---|---|---|---|---|
| | L | C | R | L | C | R | L | C | R | L | C | R | L | C | R | L | C | R | L | C | R | L | C | R |
| 1 | X | X | X | X | X | X | X | X | X | X | X | X | X | X | X | X | X | X | X | X | X | X | X | X |
| 2 | X | X | X | X | X | X | X | X | X | X | X | X | X | X | X | X | X | X | X | X | X | X | X | X |
| 3 | X | X | X | X | X | X | X | X | X | X | X | X | X | X | X | X | X | X | X | X | X | X | X | X |
| 4 | X | X | X | X | X | X | X | X | X | X | X | X | X | X | X | X | X | X | X | X | X | X | X | X |
| 5 | X | X | X | X | X | X | X | X | X | X | X | X | X | X | X | X | X | X | X | X | X | X | X | X |
| 6 | X | X | X | X | X | X | X | X | X | X | X | X | X | X | X | X | X | X | X | X | X | X | X | X |
| 7 | X | X | X | X | X | X | X | X | X | X | X | X | X | X | X | X | X | X | X | X | X | X | X | X |
| 8 | X | X | X | X | X | X | X | X | X | X | X | X | X | X | X | X | X | X | X | X | X | X | X | X |
| 9 | X | X | X | X | X | X | X | X | X | X | X | X | X | X | X | X | X | X | X | X | X | X | X | X |
| 10 | X | X | X | X | X | X | X | X | X | X | X | X | X | X | X | X | X | X | X | X | X | X | X | X |
| 11 | X | X | X | X | X | X | X | X | X | X | X | X | X | X | X | X | X | X | X | X | X | X | X | X |
| 12 | X | X | X | X | X | X | X | X | X | X | X | X | X | X | X | X | X | X | X | X | X | X | X | X |
| 13 | X | X | X | X | X | X | X | X | X | X | X | X | X | X | X | X | X | X | X | X | X | X | X | X |
| 14 | X | X | X | X | X | X | X | X | X | X | X | X | X | X | X | X | X | X | X | X | X | X | X | X |
| 15 | X | X | X | X | X | X | X | X | X | X | X | X | X | X | X | X | X | X | X | X | X | X | X | X |
| 16 | X | X | X | X | X | X | X | X | X | X | X | X | X | X | X | X | X | X | X | X | X | X | X | X |
| 17 | X | X | X | X | X | X | X | X | X | X | X | X | X | X | X | X | X | X | X | X | X | X | X | X |
| 18 | X | X | X | X | X | X | X | X | X | X | X | X | X | X | X | X | X | X | X | X | X | X | X | X |
| 19 | X | X | X | X | X | X | X | X | X | X | X | X | X | X | X | X | X | X | X | X | X | X | X | X |
| 20 | X | X | X | X | X | X | X | X | X | X | X | X | X | X | X | X | X | X | X | X | X | X | X | X |
| 21 | X | X | X | X | X | X | X | X | X | X | X | X | X | X | X | X | X | X | X | X | X | X | X | X |
| 22 | X | X | X | X | X | X | X | X | X | X | X | X | X | X | X | X | X | X | X | X | X | X | X | X |
| 23 | X | X | X | X | X | X | X | X | X | X | X | X | X | X | X | X | X | X | X | X | X | X | X | X |
| 24 | X | X | X | X | X | X | X | X | X | X | X | X | X | X | X | X | X | X | X | X | X | X | X | X |
| 25 | X | X | X | X | X | X | X | X | X | X | X | X | X | X | X | X | X | X | X | X | X | X | X | X |
| 26 | X | X | X | X | X | X | X | X | X | X | X | X | X | X | X | X | X | X | X | X | X | X | X | X |
| 27 | X | X | X | X | X | X | X | X | X | X | X | X | X | X | X | X | X | X | X | X | X | X | X | X |
| 28 | X | X | X | X | X | X | X | X | X | X | X | X | X | X | X | X | X | X | X | X | X | X | X | X |
| 29 | X | X | X | X | X | X | X | X | X | X | X | X | X | X | X | X | X | X | X | X | X | X | X | X |

X = SENSOR VALUE

FIG. 10

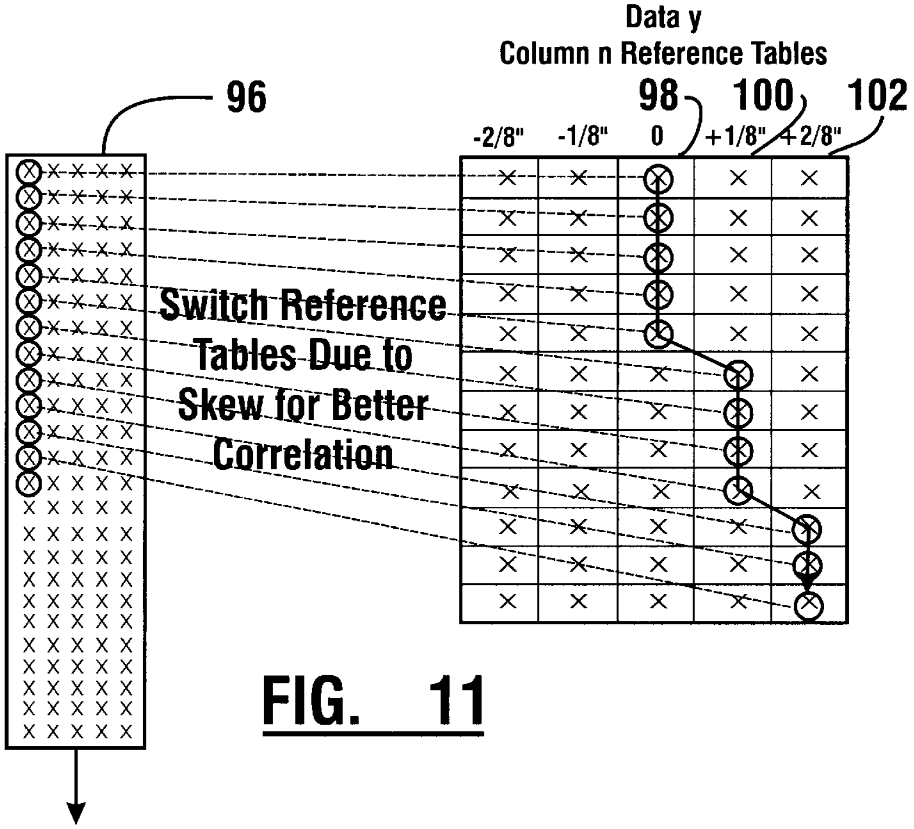

FIG. 11

APPARATUS AND METHOD FOR PROCESSING BANK NOTES AND OTHER DOCUMENTS IN AN AUTOMATED BANKING MACHINE

TECHNICAL FIELD

This application is a continuation-in-part of Ser. No. 09/135,384, filed Aug. 17, 1998, U.S. Pat. No 6,101,266, which is a continuation-in-part of Ser. No. 08/749,260, filed Nov. 15, 1996, U.S. Pat. No. 5,923,413.

This invention relates to devices for identifying the type and validity of documents. Specifically this invention relates to devices and methods for identifying conditions, denomination and authenticity of currency notes, and for processing instruments and other documents in an automated banking machine.

BACKGROUND ART

Numerous devices have been previously developed for identifying documents and determining their authenticity. Likewise, devices have been previously developed for determining the denomination and authenticity of bank and currency notes. Such devices commonly test different properties of a presented note and based on the properties sensed, give an indication of the denomination and/or authenticity of the presented note. All such prior art devices have limitations.

Many prior art devices require precise alignment of the note during sensing of its properties. This requires the device to include a mechanism to align the notes and often limits the speed at which the notes can be processed. In addition, some devices require that presented notes be oriented in a particular way as they are sensed. This limits their usefulness as notes are often not presented in a uniform orientation.

Many prior art devices for determining note denomination and validity are capable of processing only a small number of note types. This presents drawbacks as other note types cannot be processed. Such prior art devices are also generally made to be used with only one type of currency bills such as the currency of a particular country. Often it is difficult or impossible to adapt such devices to handle currencies of countries which have different physical properties. Furthermore, it may be difficult to adapt such devices to a new printing series of notes within the same country.

Many prior art devices are also amenable to compromise by counterfeit notes. It is becoming easier to produce highly accurate counterfeit reproductions of currency. By mimicking the properties of a note that are tested by prior art currency denominators and validators, it is often possible to have counterfeit notes accepted.

To minimize the risk of acceptance of counterfeits, the range of the acceptance criteria in prior art devices can often be set more closely. However, currency notes in circulation change properties through use fairly quickly. Notes in circulation may change their properties through handling and wear. Notes may become dirty or marked with ink or other substances. Notes may also lose their color due to having been mistakenly washed with clothing or exposed to water or sunlight. Prior art currency denominators and validators may reject valid notes which exhibit such properties when the criteria for acceptance is set too tightly.

Note denominators and validators currently available may also be difficult to program and calibrate. Such devices, particularly if they must have the capability of handling more than one type of note, may require significant effort to setup and program. In addition, such devices may require initial calibration and frequent periodic recalibration and adjustment to maintain a suitable level of accuracy.

Prior art note denominators and validators, particularly those having greater capabilities, often occupy significant physical space. This limits where they may be installed. In addition, such devices also often have a relatively high cost which limits their suitability for particular uses and applications.

Prior art devices for determining the conditions of notes are not as effective and accurate as would be desired. For example, it is often desirable to determine that a note has a condition that requires special handling. This may include conditions such as that the note is a double note, that the note is soiled or that the note is worn. There is further often a desire to segregate notes, that although determined as genuine, have a condition that makes it undesirable to deliver the notes into circulation.

There may be a desire in automated banking machines and other types of machines where transactions are conducted, to determine the particular bank notes that were involved in a given transaction. This may be useful in the investigation of criminal activities. For example it may be desirable to determine transaction information such as the identity of an individual depositing notes into an automated banking machine when one or more of the notes deposited are suspect as to genuineness, or upon the sensing of other conditions. Similarly tracking the particular currency bills that are dispensed from a banking machine may be useful for tracking the source of a payment.

It is also becoming more common for automated banking machines to include devices for authenticating instruments such as checks. Automated banking machines which have this capability generally include a dedicated device for reading and imaging checks. Such devices are often complex and expensive and they may add substantially to the initial purchase price and service cost associated with operating an automated banking machine.

Thus, there exists a need for a currency note denominator and validator which is more accurate, has greater capabilities, is faster, smaller in size, and lower in cost. There further exists a need for an apparatus and method that may be used to accurately and reliably determine a condition of a note. There further exists a need for a device which may be used in an automated banking machine to determine the identity of particular currency bills involved in a particular transaction. There further exists a need for a device which can serve the functions of both a currency denominator and validator and an acceptor and imager for instruments deposited in an automated banking machine.

DISCLOSURE OF INVENTION

It is an object of the present invention to provide an apparatus that indicates the identity of a note.

It is a further object of the present invention to provide an apparatus that indicates the identity of a note, that operates rapidly.

It is a further object of the present invention to provide an apparatus that indicates the identity of a note, that does not require that the note have a particular alignment or orientation.

It is a further object of the present invention to provide an apparatus that indicates the identity of a note, that identifies notes exhibiting a variety of wear and aging conditions.

It is a further object of the present invention to provide an apparatus that indicates the identity of a note, that is capable of handling a wide variety of sizes and types of currency notes.

It is a further object of the present invention to provide an apparatus that indicates the identity of a note, that may be readily setup for operation.

It is a further object of the present invention to provide an apparatus that indicates the identity of a note, that is compact in size.

It is a further object of the present invention to provide an apparatus that indicates the identity of a note, that is economical to use and manufacture.

It is a further object of the present invention to provide an apparatus that indicates the identity of a note, that is reliable.

It is a further object of the present invention to provide an apparatus that captures image data from a portion of a bill or note.

It is a further object of the present invention to provide an apparatus that correlates particular notes or bills with transactions conducted at an automated banking machine.

It is a further object of the present invention to provide an apparatus that performs the combined functions of denominating types of notes and for reading instruments that are not notes in an automated banking machine.

It is a further object of the present invention to provide an apparatus that can determine the validity of a note using distinctive radiation profiles.

It is a further object of the present invention to provide an apparatus that is capable of reading and verifying the genuineness of a watermark on a sheet.

It is a further object of the present invention to provide a method for identifying a type associated with a note.

It is a further object of the present invention to provide a method for identifying a type associated with a note, that is accurate.

It is a further object of the present invention to provide a method for identifying a note, that is capable of identifying a condition of a note, such as a double, or wear and aging conditions.

It is a further object of the present invention to provide a method for identifying a note, which can be used with a wide variety of notes of various orientations.

It is a further object of the present invention to provide a method for identifying notes, that can be performed rapidly.

It is a further object of the present invention to provide a method for identifying a note, that can be used to identify notes that are not consistently aligned or in a particular orientation.

It is a further object of the present invention to provide a method for determining a condition of a note.

It is a further object of the present invention to provide a method for determining the genuineness of a note.

It is a further object of the present invention to provide a method for determining a note type based on radiation profiles associated with notes.

It is a further object of the present invention to provide a method for detecting and verifying watermarks on a sheet.

It is a further object of the present invention to provide a method of operating an automated banking machine which uses a common device for identifying currency bills and for capturing image data from instruments deposited in the machine.

It is a further object of the present invention to provide a method for capturing image data from selected portions of currency bills.

It is a further object of the present invention to provide a method for correlating information regarding currency bills with transactions conducted through an automated banking machine.

Further objects of the present invention will be made apparent in the following Best Modes for Carrying Out Invention and the appended claims.

The foregoing objects are accomplished in an exemplary embodiment of the invention by an apparatus and method for providing an indication of the type of a note and/or for determining a condition of a note. The apparatus is preferably used for providing signals indicative of a denomination of a currency note. This apparatus may also provide an indication of note orientation and/or note authenticity. For purposes of this disclosure a note or bill shall be considered to include any preprinted document of value.

The exemplary embodiment of the invention is used in connection with a transport for moving notes. A plurality of spaced spot sensing assemblies are disposed transversely to a direction of note movement in a transport path through the transport. In an exemplary form of the invention, three spot sensing assemblies are used, although other embodiments of the invention may include other numbers and types of such assemblies.

In one exemplary embodiment each assembly includes a radiation source which comprises a plurality of emitters. Each emitter generates radiation at a different wavelength. In one exemplary form of the invention four emitters are used. The emitters generally span the range of visible light as well as infrared. In one exemplary form of the invention the emitters include in each assembly red, green, blue and infrared emitters. Each of the emitters in an assembly is aimed to illuminate a spot on a passing note.

Each spot sensing assembly includes a first detector. The first detector is positioned on a first side of the note as it passes in the note path through the transport. In one exemplary embodiment the first detector is positioned in centered relation with respect to the emitters. The first detector senses radiation from the emitters reflected from the test spots on the note.

Each assembly in the exemplary embodiment also includes a second detector. The second detector is positioned on a second side of the note opposite the first detector. The second detector detects radiation from each emitter that passes through the test spots on the note.

The exemplary apparatus of the invention includes one or more circuits in operative connection with a data store, which may comprise one or more computers. The circuit is operable to actuate each of the emitters in each spot sensing assembly in a sequence. In accordance with one form of the invention in the sequence all of the emitters of the same type produce radiation simultaneously while all of the other types of emitters are off. Alternatively, the sequence may provide for emitters in the spot sensing assemblies to be turned on at different times. However, in the exemplary embodiment only one emitter in each spot sensing assembly is active at any one time while the sensors are being read. In this exemplary embodiment the emitters are activated in the sequence continuously.

The emitters are sequenced numerous times as the note in the transport passes adjacent to the spot sensing assemblies. As a result, three sets of test spots arranged in a line are sensed on each passing note.

For each test spot, the first detector which senses reflection produces a first signal responsive to each emitter. Each first signal is representative of the amount of radiation reflected from the test spot from a corresponding emitter. Likewise, the second detector produces second signals responsive to the amount of light transmitted through the test spot on the note from each emitter.

The circuit is operative to receive the first and second signals from the first and second detectors respectively, and to generate reflectance and transmission values in response thereto. In the exemplary embodiment for each test spot four reflectance and four transmission values are generated. Likewise, for each row of three test spots which are checked on the note simultaneously by the three spot sensing assemblies, twelve reflectance values and twelve transmission values are generated. In one exemplary form of the invention generally about 29 rows of test spots are sensed as the note moves past the spot sensing assemblies. This results in the circuit generating about 348 reflective values and 348 transmission values per note.

In the exemplary embodiment the values in the data store include values corresponding to reflectance and transmission values for a number of note types in various orientations and spatial positions. The circuit is operative to generate stored value sets from the values in the data store. Stored value sets are generated based on the angle of skew of the note, which is detected as it passes the sensing assemblies. Numerous stored value sets are generated by the circuit, each corresponding to a particular note, denomination, note orientation, and note position.

The circuit is operative to calculate values representative of the levels of correlation between the sensed value set of reflectance and transmission values for the note, and each of the stored value sets. By comparing the level of correlation between the sensed value set and the stored value sets, a highest correlation value is determined. The highest level of correlation will be with a stored value set that corresponds to the particular denomination and orientation of the note which passed through the transport to produce the sensed value set. The circuit is operative to generate a signal indicative of the note type it identifies.

In one exemplary form of the invention the circuit is operative to compare the highest correlation value with a set threshold value. Even worn notes and those that have been subject to abuse exhibit a relatively high level of correlation with a stored value set for the correct note type. If however, the level of correlation is not above the set threshold, then the note may not be identifiable, or it may be a counterfeit or it may be identified and determined to be unfit for reuse. The circuit generates signals indicative of these conditions.

The highest correlation value above the threshold for determining the note type may also be compared to further thresholds corresponding to note conditions. For example double notes, notes which are soiled or notes which are worn may be identified by comparing the highest correlation value with thresholds corresponding to notes exhibiting such conditions. The determination of note condition may also be made by using the highest correlation value above a threshold to identify the note type, and then comparing the reflectance and transmittance data characteristics, such as average values for one or more emitter types, to stored further thresholds corresponding to conditions for the note type. Alternatively, the determination of note conditions may be made without determination of the note type. This may be done based on sensing transmission and reflectance values for one or several frequencies of radiation at one or several test spots on a note. The transmission and reflectance values are processed together and compared to thresholds indicative of note conditions.

In alternative forms of the invention the data used to identify bill type is gathered using detectors arranged in linear arrays in which each detector senses reflected radiation originating with an associated emitter. This may be done for example using contact image sensors which provide a plurality of sensors having relatively close spacing. The linear arrays and contact image sensors may be spaced generally transverse to the direction of sheet travel. Such contact image sensors may have emitters which generate different wavelengths of radiation in the manner of the first embodiment to produce the sets of data related to each type of emitter. In addition or in the alternative, one or more linear arrays of radiation sensors may be positioned on an opposed side of the sheet path from an emitter that is positioned to sense reflected radiation. Such an opposed linear array may be used to detect transmitted radiation and to produce data sets related to a passing sheet in the manner of the first described embodiment. The sensors for detecting transmitted radiation may be part of a contact image sensor in which the associated emitter is not used when transmitted radiation is being sensed. Various numbers, types and arrangements of emitters and sensors may be used in embodiments of the invention.

Exemplary forms of the present invention may be used for detecting the reflection and transmission properties of sheets such as bills and instruments in the non-visible range. This may include for example infrared or ultraviolet patterns that are characteristic of certain types of sheets. For example certain characteristic patterns may be indicative of genuineness for a particular denomination or other type of currency bill or instrument. In addition radiation signals and particularly transmitted radiation, may be useful for detecting watermarks and similar identifying features included in sheets.

In alternative forms of the invention relatively close spacing of radiation sensors enables detailed scanning and comparison of selected portions of notes to stored data. This may facilitate concentrating the analysis on particular areas of a sheet which are known to include features that are indicative of genuineness and/or difficult to counterfeit. A further advantage of some alternative embodiments is that relatively close spacing of sensors enables capturing data corresponding to an image on a sheet. This can be used for capturing and/or reading data from instruments such as checks, which may be deposited into an automated banking machine. Reading such information enables checks and other instruments to be validated and data therefrom captured in data storage. In addition the capability of capturing an image from a sheet enables correlating particular sheets with transactions conducted through an automated banking machine or other device utilizing an embodiment of the invention. For example it may be possible in some embodiments to determine the serial numbers of currency bills dispensed to a particular user. This may be used to provide information on where the money is later spent by the user. Such information may be useful in both law enforcement activities as well as business applications such as determining the benefits of having an automated banking machine to dispense cash within a facility by virtue of patrons spending the cash at the facility.

A further useful function which may be achieved by capturing image data from currency bills is the ability to correlate particular bills with transactions, such as transactions conducted at an automated banking machine. This may be useful when deposited bills are suspect and it is desired to know exactly what transactions the suspect bills pertain to. This may enable law enforcement or other persons to determine the identity of the individual who deposited such suspect notes. In some circumstances deposited currency notes may appear sufficiently genuine that they should not be declared invalid, but they have properties or characteristics that they may warrant further review to determine if they are in fact genuine. In such circumstances images of serial numbers or other identifying data from the notes may be captured in embodiments of the invention. This will enable correlating the notes with the particular transaction, including the individual depositing the notes. In such circumstances if the bills are later determined to be counterfeit, the individual to be notified and whose accounts must be adjusted can be more readily identified.

In embodiments of the invention the ability to perform both the functions of currency denomination and validation, as well as capturing data from deposited instruments, provides benefits by avoiding the need for two separate dedicated function devices within an apparatus. Additional advantages of the present invention will be apparent from the discussion herein.

BRIEF DESCRIPTION OF THE DRAWINGS

FIG. 10 is a tabular representation of the data shown in FIG. 9 shifted for purposes of calculating a value representative of a level of correlation.

FIG. 11 is a schematic representation demonstrating how sensed value data from a skewed note may be correlated with data stored in the data store of the invention.

BEST MODES FOR CARRYING OUT INVENTION

Figure 1:
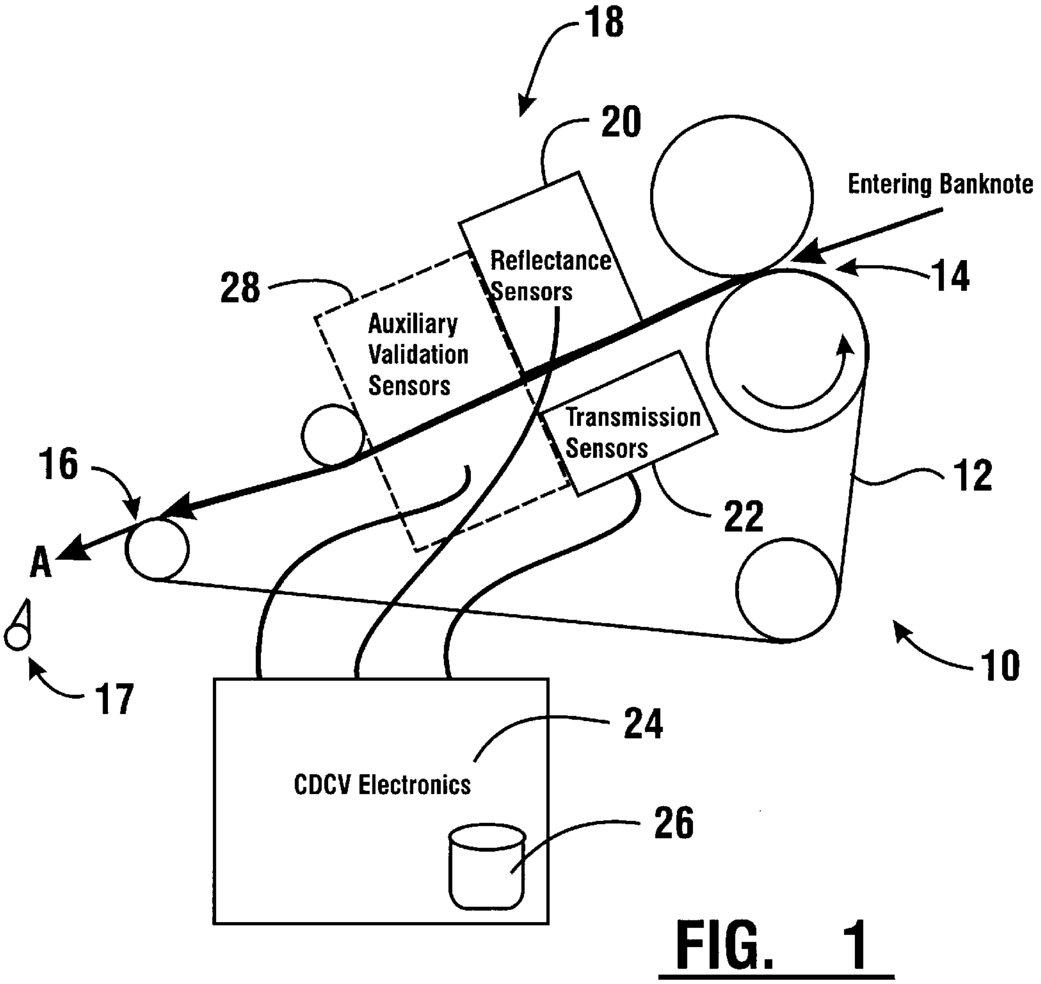
FIG. 1 is a schematic of an exemplary embodiment of the apparatus for identifying notes of the present invention.

Referring now to the drawings and particularly to FIG. 1, there is shown therein one exemplary embodiment of an apparatus of the present invention generally indicated 10. The apparatus includes a note transport 12. Transport 12 is preferably a belt-type transport that moves sheets such as currency notes one at a time along a path from an entry end 14 to an exit end 16. Sheets such as notes move on the transport 12 in a note direction indicated by Arrow A.

The exemplary embodiment of the present invention may be used in an automated banking machine. For example the apparatus of the invention may be used as an identification device in the automated banking machine shown in allowed copending U.S. patent application Ser. No. 09/193,016 filed Nov. 17, 1998, the disclosure of which is incorporated by reference as if fully rewritten herein. In such an automated banking machine, the apparatus described herein may be used to determine types of currency bills such as the denomination and/or validity of a bill passing along a transport path in the machine. In such an automated banking machine embodiments of the invention may be used to separate denominations of bills for purposes of counting and storage in the machine, or to determine the denomination of a bill or type of sheet prior to delivery from the machine to a customer. Embodiments of the invention may be used to identify counterfeit or suspect currency bills. Such devices may also be used to identify and separate currency bills from other types of sheets, to identify double or overlapped sheets and bills, as well as other note conditions in the automated banking machine. Various functions and uses for the present invention are described herein or will be apparent to those skilled in the art from the description of the exemplary embodiments presented herein.

A first exemplary sensing assembly of the apparatus includes a plurality of spot sensing assemblies 18. The first exemplary form of the invention shown includes three spot sensing assemblies which are spaced from one another in a direction transverse of the note direction of note movement (see FIG. 3).

Each of the spot sensing assemblies includes a reflectance detector, schematically indicated 20. Each spot sensing assembly 18 also includes a transmission detector schematically indicated 22. As indicated in FIG. 1 the reflectance detector 20 is in operative connection with, and outputs first signals to, one or more control circuits schematically indicated 24. The transmission detectors 22 are also in operative connection with the control circuit 24, and the transmission detectors output second signals thereto. Control circuit 24 is also in operative connection with a data store schematically indicated 26 which holds stored values in a manner later explained. In embodiments of the invention the control circuit may comprise one or more circuits or computers, including processors and operatively connected data stores for holding data and program instructions.

The apparatus of the present invention may in certain embodiments also include auxiliary validation sensors schematically indicated 28. The auxiliary sensors 28 may detect properties of passing notes that are not detected by the spot sensing assemblies. These auxiliary sensors may include, for example, magnetic type, sensors or sensors for sensing identification strips on passing notes or sheets. The auxiliary sensors 28 do not form part of the present invention and are not further discussed herein. It will be understood however, that many types of auxiliary sensors may be used in connection with the present invention and the signals output by such sensors are processed and analyzed in the control circuit 24 through appropriate electronic components.

Figure 2:
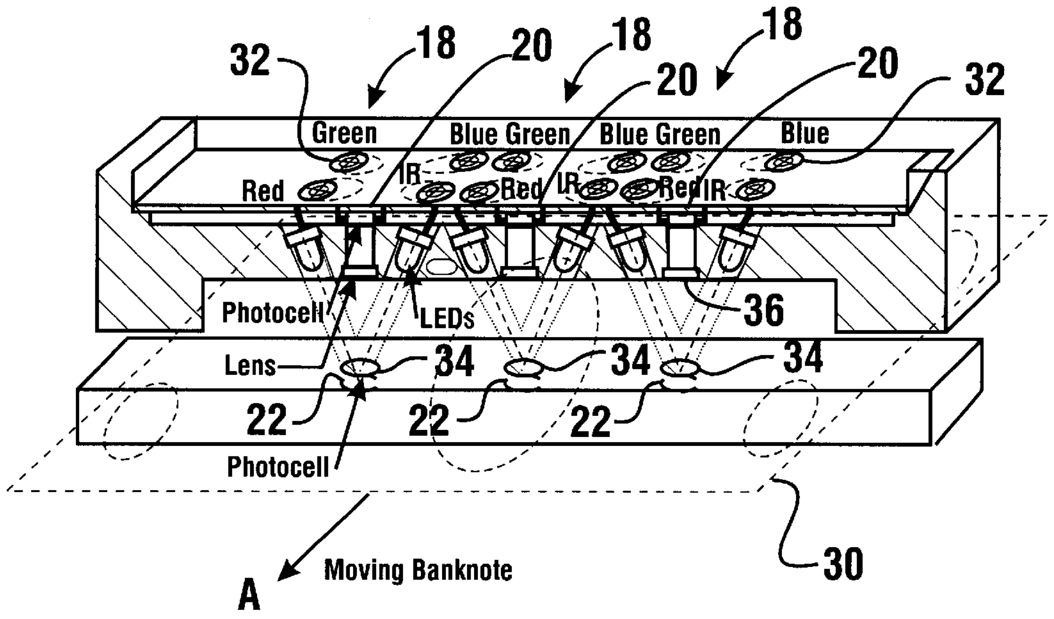
FIG. 2 is an isometric schematic view of three spot sensing assemblies sensing test spots on a moving note.
Figure 3:
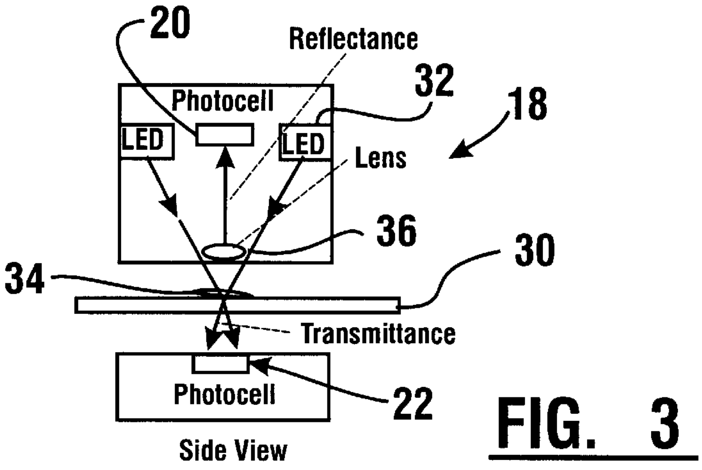
FIG. 3 is a schematic view of a spot sensing assembly.

The exemplary spot sensing assemblies 18 are shown in greater detail in FIGS. 2 and 3. Each spot sensing assembly includes a reflectance detector 20, which in the exemplary form of the invention includes a photocell. The reflectance detectors 20 are positioned on a first side of a passing note 30 in the note path which is shown in phantom in FIG. 2. The transport 12 moves note 30 in the note path past the spot sensing assemblies.

Each spot sensing assembly 18 includes four emitters 32. The emitters 32 are positioned generally adjacent to, and in surrounding relation of, each reflectance detector 20. Each spot sensing assembly includes emitters with wavelengths which generally span the visible range of light and infrared. In the described embodiment each spot sensing assembly includes a blue emitter, a green emitter, a red emitter, and an infrared emitter. In the exemplary form of the invention, the emitters are light emitting diodes (LEDs) which are selectively operable to produce generally monochromatic light at a particular wavelength. In other embodiments of the invention other types and wavelengths of emitters may be used.

Each emitter 32 in a spot sensing assembly is oriented so as to direct and focus radiation onto a test spot schematically indicated 34, which is shown on the adjacent surface of a passing note. In the first exemplary form of the invention, because there are three spot sensing assemblies, properties of the note are sampled simultaneously at three test spots 34 which are transversely spaced across the bill. As best shown in FIG. 3, radiation from the emitters 32 is reflected from each test spot 34 to the reflectance sensor 20 of the spot sensing assembly. The reflected light is passed through a lens 36 adjacent to each reflectance detector to further focus the reflected light thereon.

Radiation from the emitters 32 also passes through each test spot on the test note. The transmitted radiation passes to the transmission detector 22 of each of the spot sensing assemblies 18. In the first exemplary form of the invention each of the transmission detectors 22 includes a photocell. As a result, when reflectance detector 20 senses radiation from one of the emitters reflected from the test note, transmission detector 22 simultaneously senses radiation transmitted through the test note from the same emitter.

In the exemplary form of the invention the control circuit 24 is operable to selectively actuate each of the emitters 32. The control circuit actuates each type emitter in each spot sensing assembly individually, so that only one emitter in a spot sensing assembly is producing radiation at any time.

In one embodiment, the control circuit 24 is operative to activate the same type emitter in each of the spot sensing assemblies 18 simultaneously. For example, all the blue emitters in each of the spot sensing assemblies are activated to produce radiation at the same time. Thereafter, all the blue emitters go off and all the green emitters in each of the spot sensing assemblies come on. Thereafter, the green emitters go off and the red emitters come on. When the red emitters go off the infrared emitters come on. The infrared emitters go off and the sequence repeats. Alternatively, the emitters may be activated in a "marquee" style so that the particular type emitter in each assembly is on for a time before it is read, and emitters of the same type are read at different times. This approach has the advantage that it enables the emitters to stabilize before being read by the controller. Of course, the sequence of emitters may be different in other embodiments.

The emitters radiate individually and in sequence rapidly such that each emitter comes on one time for each test spot 34. The test spots preferably are discrete and each of the emitters direct light onto generally the same spot on the note during one sequence despite the fact that the note is moving.

As those skilled in the art will appreciate from the foregoing description, each reflectance detector 20 produces four first signals for each test spot 34. The four first signals are produced responsive to radiation from the blue, green, red, and infrared emitters respectively. Similarly, each transmission detector 22 produces four second signals for each test spot 34. There is one second signal for the radiation transmitted through the test spot from each of the four emitters in the spot sensing assembly.

The control circuit 24 receives each of these first signals and is operative to generate a reflectance value responsive to each signal representative of the magnitude of light reflected by the note 30 from each of the emitters. Likewise, the control circuit 24 is operative to generate transmission values responsive to each of the four second signals from transmission detector 22. Each of the transmission values are representative of transmitted light through the test spot from each emitter. Because there are three spot sensing assemblies 18 spaced transversely across the note, the first circuit is operative to generate 12 reflectance values and 12 transmission values for each row of 3 test spots 34 on the note.

In the first exemplary form of the invention, the control circuit 24 is operative to actuate the emitters in the spot sensing assemblies very rapidly. This is done so the test spots are maintained discrete and compact. A number of test spots are preferably sensed as a note moves past the three spot sensing assemblies 18 in the transport. In one exemplary form of the invention, the spot sensing assemblies are actuated so that each spot sensing assembly senses about 29 test spots on a standard U.S. currency note. This means that generally (29×3=87) test spots are sensed on the average note. Because 4 transmission and 4 reflectance values are generated per test spot (87×8=696), about 696 data values per note are gathered.

The transport 12 is preferably moved in such a speed that 15 standard U.S. currency notes per second are moved past the spot sensing assemblies. Of course, in other embodiments different numbers of test spots, data values and note speeds may be used.

An advantage of the currency identification technique of some embodiments of the present invention is that the emitters produce radiation which spans the visible range of light as well as infrared. This provides signals which test the validity of the note at a number of different wavelengths in both the transmission and reflectance modes. This enables the gathering of much more data concerning the note image and material properties than prior types of note denominators and validators.

Another advantage of exemplary embodiments of the present invention is that they may be capable of identifying many types of notes in different orientations. As later explained, the exemplary form of the present invention does not require that the notes be precisely aligned either in the note direction, or transversely in the note path.

Figure 4:
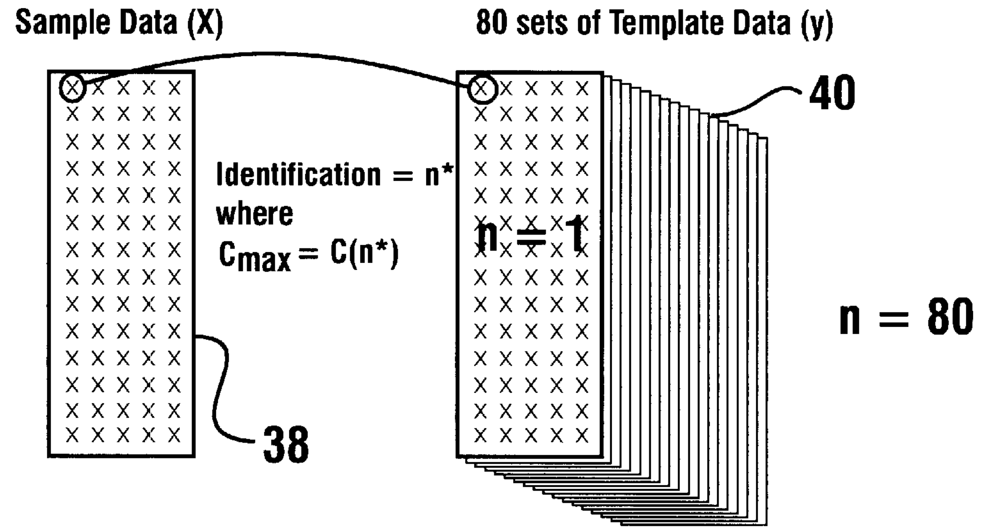
FIG. 4 is a schematic representation demonstrating how a set of sensed data values from a test note may be correlated with previously stored value sets for a plurality of note denominations and orientations in the operation of the exemplary apparatus of the present invention.

As schematically represented in FIG. 4, a note which is delivered to the sensing assembly for identification and validation may be one of many types. One form of the invention is configured to identify 20 different denominations of notes. Of course, other embodiments of the invention may analyze different numbers of note denominations. However, in the exemplary form of the present invention, there is no requirement that the notes delivered be oriented a particular way. Therefore, notes may be delivered face up, face down, as well as with the top of the note leading, or with the bottom of the note leading. To identify the note as a particular type, the exemplary embodiment must be able to handle notes delivered in all four orientations.

In FIG. 4, a sensed value set 38, representative of a set of data sensed from the test note is shown. As previously discussed, in one exemplary embodiment, this sensed value set will generally include a set that is 24 by 29. This is because each row of three test spots generates 24 values (12 reflectance and 12 transmission) and there are generally 29 rows of test spots on the note.

The night side of FIG. 4 shows stored value sets 40. In the exemplary form of the invention, the stored value sets are produced by the control circuit 24. The sensed value set 38 generated from the note is compared for correlation with each of the stored value sets 40. In FIG. 4, 80 stored value sets are shown. This is representative of the 20 note denominations multiplied by four possible orientations for each note type.

As will be later explained in detail, in one exemplary form of the invention, there are many more than 80 stored value sets to which a sensed value set is compared. This is because the apparatus must determine not only the particular note type (from among 80 possible note types and orientations), but must also determine the note type even though the note position may be shifted either in the direction in which the note is transported or transverse to the note direction, or may be skewed relative to the direction of sheet movement.

Figure 5:
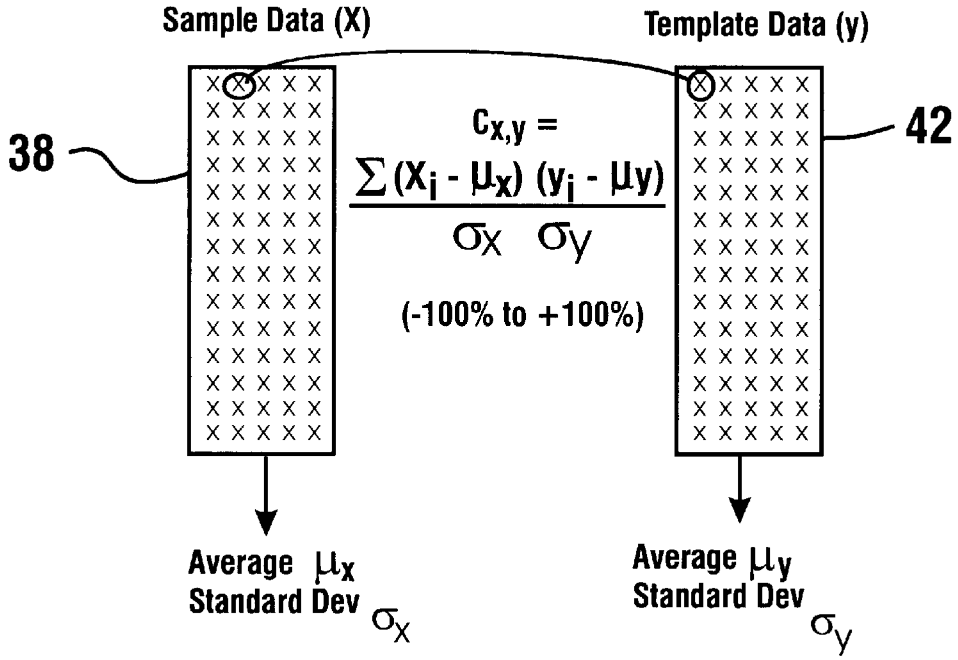
FIG. 5 is a schematic representation demonstrating an exemplary calculation of a value representative of a level of correlation between a set of sensed data values and a stored data value set for a particular note type.

The process by which one form of the control circuit calculates the values representative of the level of correlation between the sensed valued set (which is representative of the reflectance and transmission values from the sensed note) and the stored value sets, is schematically represented in FIG. 5. For purposes of the correlation calculation carried out by the control circuit 24, the sensed value set 38 is considered to be (x) data. The data values in the stored value set indicated 42 are considered to be (y) data. The level of correlation is calculated in accordance with the equation:

$$C_{xy} = \frac{\sum (x_i - \mu_x)(y_i - \mu_y)}{\sigma_x \sigma_y}$$

where:

$C_{xy}$ is the correlation coefficient.

$x_i$ is the sensed value from the sensed value set data.

$y_i$ is the corresponding value in the stored value set.

$\mu_x$ is the average of the values in the portion of the sensed value set being correlated.

$\mu_y$ the average of the values in the corresponding portion of the stored value set being correlated.

$\sigma_x$ is the standard deviation of the sensed values in the portion of the sensed value set being correlated.

$\sigma_y$ is the standard deviation in the corresponding portion of the stored value set.

As will be appreciated, the greater the correlation coefficient the higher the level of correlation between the sensed value set and the stored value set being compared. A high value is indicative that the stored value set corresponds to the particular type test note that generates the data in the sensed value set. It should be understood that this technique is exemplary and in other embodiment s other methods for determining correlation may be used.

Figure 6:
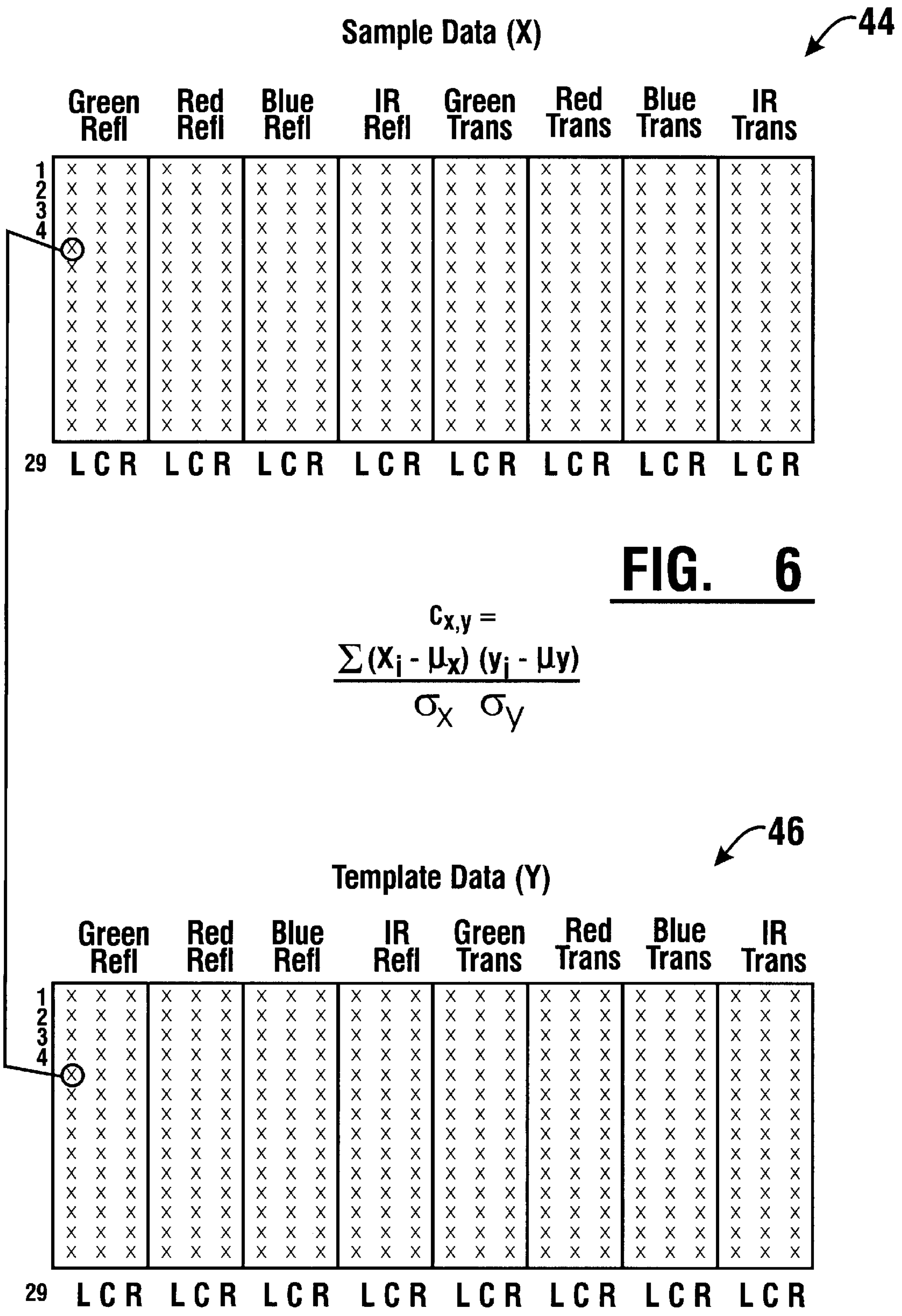
FIG. 6 is a schematic representation of data sensed from three spot sensing assemblies and an exemplary calculation of a value representative of a level of correlation between the sensed value set and a stored value set.

Turning now to FIG. 6 there is schematically shown a sensed value set 44 from a note that is moved in the note path past spot sensing assemblies 18. As shown in the upper portion of FIG. 6, sensed value set 44 is a matrix that is 24 by 29. The lower portion of FIG. 6 shows a similarly sized stored value set 46 which is generated by circuit 24 from data in the data store 26 in a manner later explained.

In one exemplary form of the invention each set comprising the three columns of "x" values representing one color and mode in sensed value set 44 is checked for correlation with corresponding values in the three columns of stored value set 46. A correlation coefficient is calculated for the values in each triple column set. The correlation coefficients for each of the 8 triple column sets are then multiplied together by the control circuit to obtain an overall correlation value indicative of a level of correlation between the sensed value set and the stored value set.

In one form of the invention the correlation coefficient values for reflectance mode values are first multiplied together to obtain an overall correlation value for reflectance. Thereafter the same is done for all correlation coefficient values for transmission mode values to obtain an overall value for transmission. These overall values are then multiplied together to calculate a final value indicative of correlation of the stored value set and the test note.

Calculating the transmission and reflectance values separately has the advantage that the individual values can be analyzed individually by the control circuit in accordance with its programming. This may be desirable in some embodiments. For example, high correlation for overall reflectance but not transmission may be indicative of some quality or condition of the note that may warrant taking it out of circulation. This may include for example that the note is worn or soiled, or that it is a double note in which two genuine notes are moving in overlapped relation.

Other embodiments may combine correlation values in other ways, such as by wavelength or radiation. The combination of correlation values for analysis may differ in other embodiments depending on the notes and properties of interest. In one form of the present invention, because the stored value sets generated are arranged in matrices, the device can analyze certain physical areas on notes in detail through programming of the control circuit. Thus in embodiments of the invention the manner in which sensed and stored value sets are generated and correlation values calculated may be tailored to note properties and areas of interest.

The particular type of note passing through an apparatus of the invention, is generally indicated by the stored value set having the highest overall level of correlation with the sensed value set. This stored value set corresponds to one note type, for example, a particular note denomination in a particular orientation. Once the control circuit determines the stored value set with the highest level of correlation, it then indicates the particular type of note that it has determined the passing note to be by generating a signal indicative thereof.

In some embodiments it is also desirable to point out situations where the passing note has a relatively low level of correlation with all of the possible note types. This may be indicative of a counterfeit note, a foreign note or currency that is unacceptable for reuse due to tears, dirt, wear, or extraneous markings. It may also indicate in some embodiments a sheet type other than a note which is to be handled in a manner different from currency notes. The control circuit 24 is operable to provide an indication not only of the identity of the note type which best correlates with the sensed value set, but may also indicate when the calculated highest level of correlation is below a set threshold which suggests a counterfeit or unacceptable note.

Alternatively, the control circuit of the apparatus of the present invention may be configured to include several set thresholds for correlation. These may correspond to notes which are suspect as counterfeit or severely damaged, and notes which merely exhibit signs of wear, age or abuse which make them unacceptable for return to circulation. In some cases notes may have sufficient properties of genuineness so that they are provisionally identified as genuine subject to later further analysis. In some embodiments of the invention such notes may be specifically identified by being segregated from other notes in the machine, and data stored in an automated banking machine or elsewhere may correlate information related to the transaction with such suspect notes. Such transaction data may include for example, information concerning the person depositing such notes in the machine. As later discussed, in alternative forms of the invention data corresponding to an identifying image on suspect notes may be stored to further provide correlation with the particular transaction. Such captured image data may include all or a portion of a serial number or similar identifying data which can be used to identify the particular notes. In the case where the invention is used in an automated banking machine, image data of the user may also be captured with other transaction data. This may be done for example, by using the AccuTrack™ image capture system available from Diebold, Incorporated. Correlation properties determined from the data sensed may also be indicative of other note conditions or properties. This may also include notes in a double. Because one exemplary form of the present invention provides data which accurately identifies notes by denomination despite wear, dirt and extraneous markings, it is possible to make such judgments concerning the quality or conditions of a note as well as to identify its type.

In some embodiments it is desirable to determine type of note by comparing the highest correlation value to a threshold. Then the average reflectance and transmission values are calculated and compared with one or more thresholds corresponding to conditions for the particular note type. This averaging and comparing may be done for radiation at a particular frequency from a single emitter or may be done for values generated from several or all of the emitters. In some embodiments reflectance and transmission values may be weighed differently, and/or combined, based on the condition being detected and approaches which achieve a desired level of sensitivity. In one embodiment, reflectance values and transmission values for each emitter frequency are averaged. These average values for the particular note (8 values in this exemplary embodiment) are then compared to condition thresholds stored for the particular note type. This approach may be used to increase the reliability of detecting poor quality notes by using optimized values for data thresholds which are unique to each note type. This approach may also increase flexibility in enabling many types of notes from different countries to be identified and various conditions determined in the same unit.

Some forms of the present invention may also provide data which may be used advantageously specifically for counterfeit detection purposes. The ability of the exemplary embodiment to test both transmission and reflectance properties across a broad spectrum of radiation, and to compare sensed data to stored values for proper notes, enables the setting of thresholds for particular wavelengths of radiation. Some wavelengths of radiation may provide data more indicative than others of counterfeit or unacceptable notes. This is particularly true in countries which have currency notes that include different color schemes for different denominations. The control circuit of the exemplary form of the present invention may be programmed to abstract and analyze particular abstracted correlation data for this purpose.

While in the embodiment of the invention previously described, correlation coefficients are calculated for sets which correspond to 3 columns of data and these correlation coefficients are then combined, other embodiments may use sets comprised of other portions of the sensed data for purposes of calculating the correlation coefficients. These correlation coefficients may then be combined to produce a final value indicative of correlation with the stored value data. For example, correlation values may be calculated between each column or line of sensed data and stored data. These correlation values may then be combined. Alternatively, correlation values based on 12 columns associated with each mode (transmission/reflectance) may be calculated and then the 2 values combined. Alternatively, a single correlation value for all data in the sensed and stored value sets may be calculated. The approach of calculating correlation coefficients for 3 columns of data and then combining them as described has been found to work well for U.S. currency. However, for other types of notes or documents, or for other forms of sensing hardware, other approaches to capturing data, calculating correlation coefficients and then combining them, may also be found to work well in indicating the identity of the test note or document.

Referring again to FIG. 6, it should be noted that in the embodiment of the invention shown, generally the first four rows of sensed data and generally the last three rows of such data, are not correlated with the stored value sets when the bill is transversely aligned in the note path. Generally, the calculation of the level of correlation is made between sensed value sets and stored value sets comprising 22 rows and 24 columns. As later explained, the first four rows of data sensed from the note and the last at least three rows, are generally used in this embodiment to calculate whether the note is skewed in the transverse direction of the bill path as well as to confirm that the note is the proper length. If the note is skewed the control circuit generates stored value sets by selecting values from the data store which are correspondingly transposed to correspond to the calculated angle of skew. Further, as can be appreciated by those skilled in the art, if a note is "longer" than a proper note, such that it produces data for more test spots than it should, it is identified as a suspect or counterfeit note or as an alternative type sheet by the control circuit and is rejected or treated accordingly in accordance with the programming of one or more computers in the automated banking machine or other device in which the invention is operated.

In one exemplary embodiment of the invention, notes passing the spot sensing assemblies on the transport need not be aligned either in the note direction or in a transverse direction to be identified. To achieve this, the data store includes data for all of the identifiable note types at a much closer spacing than the spacing between test spots detected by the spot sensing assemblies as a note passes. In one exemplary form of the invention, the data is collected and stored for increments that are one-fourth the spacing between the test spots on a note passing in the transport. Of course, in other embodiments of the invention other increments may be used.

Figure 7:
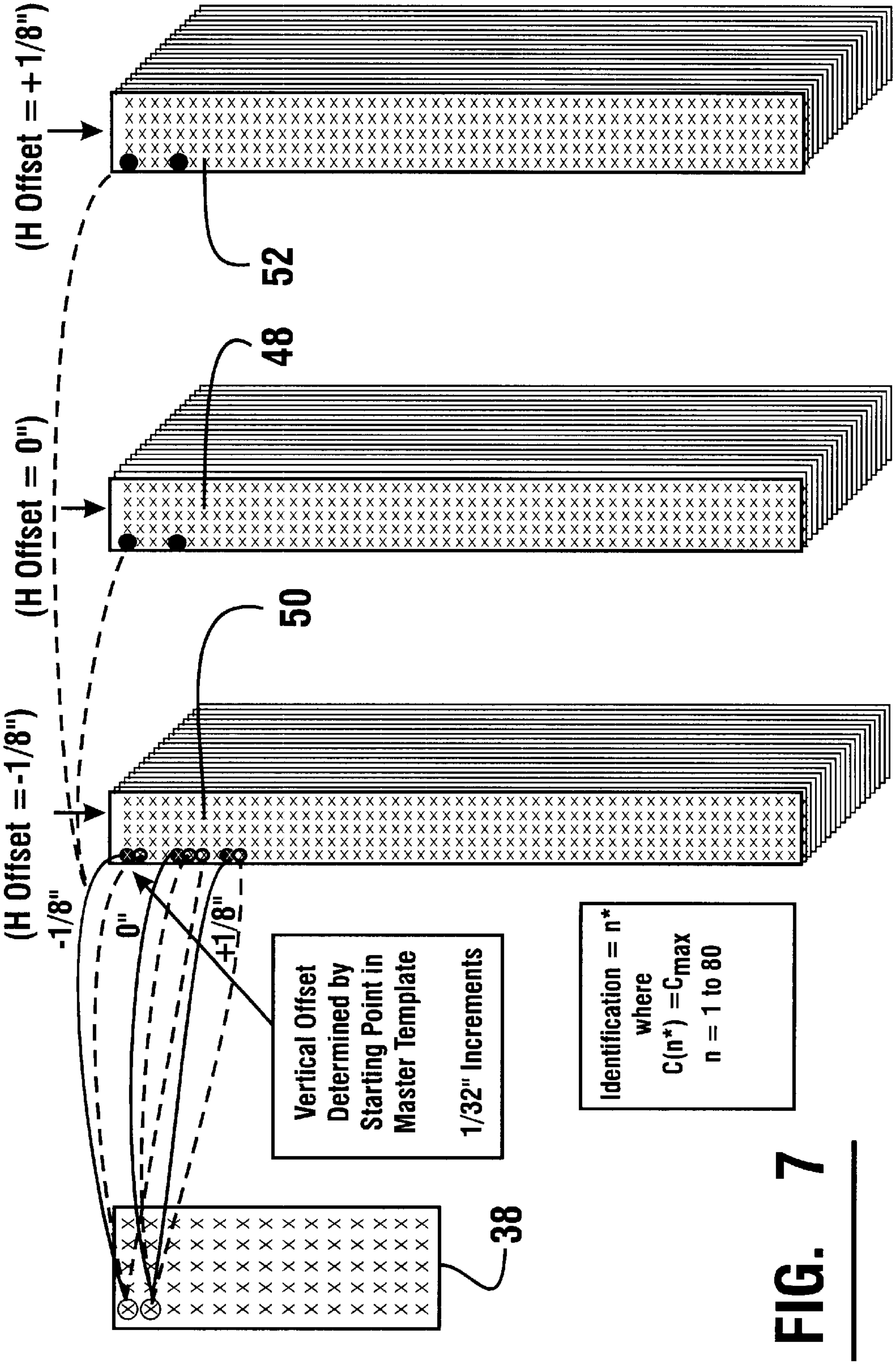
FIG. 7 is a schematic representation of values stored in a data store of an exemplary embodiment of the invention, and how this data is correlated with a sensed value set.

In FIG. 7 a sensed value set 38 is schematically represented. A first template 48 is representative of a particular type of note denomination that passes in centered relation relative to the 3 spot sensing assemblies in the transport. As a result, it is indicated in FIG. 7 as having a "0" offset. The values shown in first template 48 are the 24 transmission and reflectance values for a note of a particular type at increments one-fourth the distance between the test spots on a passing note. Thus, in this embodiment, first template 48 would be a matrix of 24 by (29×4)116 values.

Stored value sets for comparison to a sensed value set are derived from template 48 by the control circuit by taking the values in every fourth line from the template. In other words, the data in lines 1, 5, 9, 13, and so on, correspond to a note in a particular position relative to the direction a note moves in the transport. Similarly, lines 2, 6, 10, 14, and so on correspond to the same type of note in another position relative to the note direction.

From the template 48, the control circuit generates stored value sets corresponding to the particular note type to which template 48 corresponds in varied positions relative to the note transport direction.

In FIG. 7, second template 50 corresponds to the same note type as note 48. Second template 50, however, has reflectance and transmission values for test spots on the note offset a transverse increment from the test spots which produced the values in first template 48. By taking every fourth line of values from template 50 the control circuit generates stored value sets for the particular type of note, transversely offset from the centered position and in various positions relative to the direction of note transport.

Third template 52 shown in FIG. 7 corresponds to the same type of note as templates 48 and 50. Template 52 contains values corresponding to test spots on the note shifted transversely from the zero offset position in an opposed direction from template 50. Third template 52 is also a matrix of 24 by 116 values. Stored value sets are produced therefrom by the control circuit by abstracting every fourth line of values.

In this exemplary embodiment of the invention, templates are provided for test spots at several transversely offset positions. This enables notes to be disposed from the centerline of the note path as well as to have a leading edge that is not aligned with any reference, and still be identified.

The process of inputting the data necessary to produce the templates is accomplished in an exemplary embodiment during a setup mode of the apparatus. In the setup mode, stored value data is generated by positioning a note of each type in the transport. Data is gathered by each spot sensing assembly from 116 lines of test spots instead of the 29 lines which is the usual number for a sensed note. This can be accomplished by static positioning of the note or, alternatively, by moving the note at a speed which enables the spot sensing assemblies to be sequenced sufficient times to gather the data for storage in the data store.

During the setup mode, the notes are sensed while centered in the transport path as well as disposed transversely from the centered or "zero offset" position, so that the templates for notes that are transversely offset in increments are generated and stored. The ability to set up the device by using actual currency and passing it through the transport enables setup of forms of the apparatus in a rapid and reliable fashion. This is desirable where this data must be gathered for twenty notes, each of which has four orientations and several offset positions.

In one exemplary embodiment of the invention, templates are produced for four offset positions in each transverse direction from the zero offset position. These templates are offset in increments of one-eighth of an inch. This means that a note passing through the transport may be positioned within one-half inch in either transverse direction of the zero offset position and still be accurately identified.

In other embodiments of the invention it is feasible to gather and/or compute the stored values experimentally and store them in templates in the data store. Alternatively, such templates may be produced in a separate machine and then loaded into the data store of the apparatus. Provided the data is accurately gathered, the apparatus will properly indicate the type of note sensed.

Figure 12:
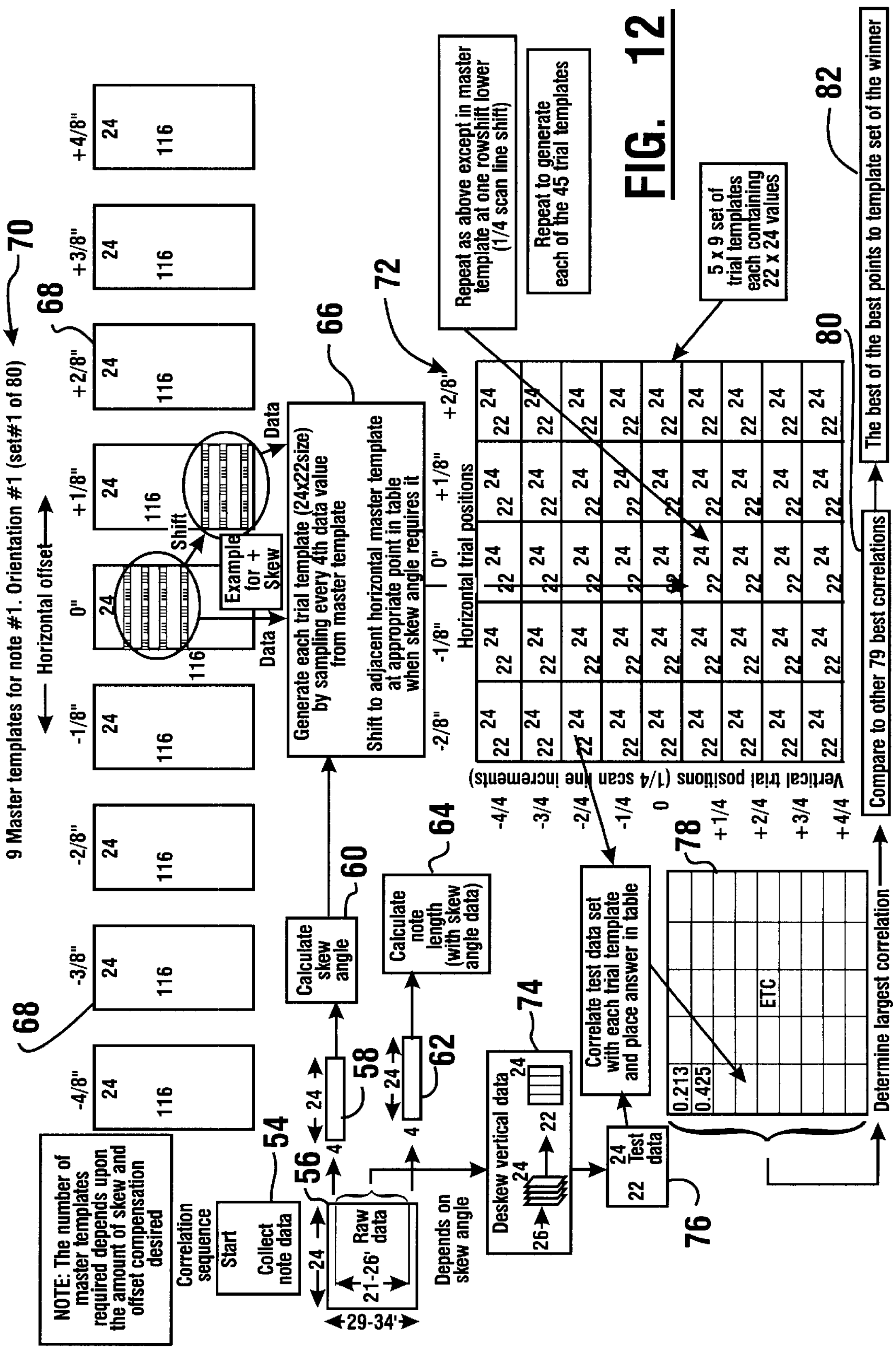
FIG. 12 is a schematic representation showing the steps in the correlation sequence carried out in an exemplary embodiment of the present invention.

The process by which the described apparatus of the present invention calculates a level of correlation and determines the identity of a note is schematically represented in FIG. 12. It should be understood that in the operation of one embodiment of apparatus 10 the control circuit 24 actuates the emitters of each of the spot sensing assemblies 18 in the sequence on a continuing basis. A note can arrive at any point during the sequence. As the note moves in the note path adjacent to and then passes the three spot sensing assemblies 18, the control circuit gathers the data at a step 54. The data gathered is arranged in memory as a matrix of values that is generally 24 by 29. This raw data is represented by matrix 56. Matrix 56 may actually contain more values if the note is skewed. However, for purposes of this initial example, a 24 by 29 matrix will be assumed which corresponds with a non-skewed note.

As represented by 4 by 24 submatrix 58, the first four rows of data from the note are used by the control circuit to calculate a skew angle at a step 60 in a manner hereinafter discussed. Further, as represented by the 4 by 24 submatrix 62, control circuit 24 is operable to calculate the note length at a step 64. In doing this, the control circuit considers the skew angle, because the spot sensing assemblies will sense more than 29 rows of test spots on a note if the note is skewed. At step 64 the length of the note is determined based on the number of test spots from which data is received, and the skew angle. The note length is compared to a stored value indicative of the number of test spots for a standard note length, and if the note is "too long" or "too short" control circuit 24 generates a signal indicative of the condition sensed.

Assuming for purposes of this example that the note is the correct length and transversely aligned with respect to the note path, the control circuit 24 is operative at a step 66 to generate stored value sets. The stored value sets are generated from templates 68. The nine templates 68 shown are each a matrix of 24 columns by 116 rows. The nine templates 68 comprise a master template 70 which corresponds to a note type (one note denomination in a particular orientation). Each of the nine templates 68 correspond to the note type in each of nine transverse positions in the note path. The 116 rows of data in each template 68 represent the transmission and reflectance values in increments one-fourth the distance between test spots on a sensed note that is passed through the transport.

In the embodiment of the invention described, the nine 24 by 116 templates 68 comprise the master template 70 which includes all the stored values corresponding to one note type. Because the described form of the invention is configured to identify twenty notes in four orientations, there are eighty master templates in the data store in this exemplary embodiment. Each of the master templates is comprised of nine templates, like templates 68. This means that in this embodiment the data store holds (80×9=720) templates, each template having (24×116−2784) data values, for a total of (720×2784=2,004,480) stored values in the data store. Of course in other embodiments other template arrangements may be used.

The control circuit 24 is operative in the example shown to produce forty-five stored value sets 72 from the templates 68 in each master template 70. These forty-five stored value sets are shown in a table in FIG. 12. These stored value sets 72 are generated by the control circuit by taking every fourth line from each of the templates 68. The control circuit preferably does this starting with the sixteenth line in each of the templates 68. This is done because, as previously discussed, the first four rows of data taken from the note are used to calculate skew angle, and are generally not used in generating the stored value sets 72 if the note is not skewed. Forty-five stored value sets 72 are generated for each of the eighty templates 70.

As can be appreciated from the foregoing discussion, with the first four rows of test spots being discarded, the first row of test spots on the note from which the data would be used for correlation purposes in this example would be the fifth row of test spots. This corresponds to the (4×5) twentieth line in each template 68. Thus the control circuit takes the twentieth line and every fourth line thereafter until 22 rows of data are read to generate a 22 by 24 stored value set 72. Stored value sets produced in this manner correspond to the "zero vertical position" in the table in FIG. 12.

However, because the note sensed may be shifted forward in the note path from the zero position, the control circuit 24 is operative to generate stored value sets 72 that are likewise shifted forward in the note direction. This is done by starting with the nineteenth line in each template 78 and taking every fourth line thereafter until 22 values are gathered. This corresponds to a shift forward one increment. Stored value sets generated in this manner are the $-\frac{1}{4}$ stored value sets 72 shown in FIG. 12.

Likewise, stored value sets shifted two increments forward are generated starting with the eighteenth line of data in each of the templates 68 and taking every fourth line thereafter. This corresponds to the $-\frac{2}{4}$ stored value sets 72 shown in the table in FIG. 12.

As can be appreciated, stored value sets are also generated starting with the seventeenth line in each template 68. These correspond to the $-\frac{3}{4}$ stored value sets 72. Stored value sets starting with the sixteenth line correspond to the $-\frac{4}{4}$ stored value sets 72 in the table in FIG. 12.

The note may also be shifted rearwards from the "zero vertical position". As a result, stored value sets 72 are produced starting with the twenty-first, twenty-second, twenty-third, and twenty-fourth values in each of the templates 68. These correspond to the $+\frac{1}{4}$, $+\frac{2}{4}$, $+\frac{3}{4}$, and $+\frac{4}{4}$ vertical position stored value sets respectively shown in FIG. 12.

Stored value sets 72 are further generated for transverse offset positions. As shown in FIG. 12 stored value sets are produced for transverse offset positions of $-\frac{1}{8}$", $-\frac{2}{8}$", $+\frac{1}{8}$" and $+\frac{2}{8}$". Thus, the 45 stored value sets 72 represent reflectance and transmission values for one note type shifted forward and backwards in the direction the note moves in the transport, as well as in both transverse directions.

While the master templates 70 consist of nine transverse sub-templates 68, in one exemplary form of the invention, stored value sets 72 are only produced for five transverse positions of the note, rather than nine. This is because the transport of the described embodiment and the manner in which the notes are delivered, generally maintain the notes within a quarter inch of the zero offset position. For this reason in the described embodiment, it is not necessary to produce additional stored value sets. However, in alternative embodiments where the transverse position of the note may be further disposed from the zero offset position, additional stored value sets may be generated by the control circuit and used.for correlation with the sensed value sets.

Referring again to FIG. 12, the matrix of raw values 56 from a test note that is sensed undergoes a vertical deskewing step 74 performed by the control circuit 24 when the note is sensed as skewed, as later explained. When the note is not skewed as in this example, step 74 has no effect on the raw data. In the present example, a sensed value set 76 which is a 24 by 22 matrix is produced by the control circuit 24 directly from the raw data.

The control circuit 24 is then operative to calculate the level of correlation between the sensed value set 76 and each of the stored value sets 72 in the manner discussed with reference to FIG. 6. Each of the correlation values is calculated and temporarily stored by the control circuit, which storage is represented by table 78. From all the correlation values calculated for each master template, one value will generally be the highest. Of course, there are eighty master templates and the control circuit is operative to find the highest level of correlation among the forty-five values for each of the 80 master templates. This is represented by a step 80 in FIG. 12. The control circuit is then operative at a step 82 to provide an indication of the identity of the note type that produced the highest correlation value and therefore most closely correlates with the sensed value set from the note that passed through the apparatus.

As previously discussed, embodiments of the invention also have stored in connection with the control circuit, data corresponding to a threshold value which the highest level of correlation value calculated must exceed before a note is considered genuine. This threshold value may be set for each note type or may be the same for several note types. The threshold may be determined through experimentation and a corresponding value stored in the data store, or calculated from stored data and dynamic factors. If the highest level of correlation for all the stored value sets does not exceed this threshold level, then the note is suspect and potentially a counterfeit. In some embodiments, for certain note types there are stored thresholds for average reflectance and transmission values for particular types of radiation. These thresholds are compared to sensed values and used for determining note conditions, such as note quality and genuineness. Suspect notes may be returned to a customer or held within the apparatus in a designated location. This is done for example by using a divert mechanism schematically indicated 17 in FIG. 1 that transports or otherwise directs notes to the designated location or in the manner of the incorporated disclosures.

Alternative embodiments including aspects of the invention may be used to segregate notes that are considered in good condition from notes that exhibit wear, abuse or soiled conditions. This may be accomplished by having stored in connection with the control circuit 24 data corresponding to a further threshold value for correlation which is above the threshold for note genuineness, but below that for notes in a desired condition. The threshold may be based on fixed and/or dynamic data. Such an intermediate threshold may be used for purposes of segregating bank notes that, while still good, are sufficiently worn or soiled such that they should be removed from circulation.

Alternatively thresholds may be set and the control circuits programmed so that notes which have sufficient qualities of a genuine note or other sheet are accepted by the machine as genuine on a provisional basis. Such notes may be subject to further analysis to determine if they are indeed genuine. Notes falling within this category may in many cases be identified by being stored in a designated location within an automated banking machine or other device utilizing the principles of the invention. This may be done in the manner of the incorporated disclosures. In addition information related to the particular transactions in which the provisionally acceptable notes are involved, may be determined and stored so that the transaction and person involved may be later identified. This may be done for example by having an automated banking machine record a particular transaction number associated with the particular transaction in which the suspect sheets are involved. Alternatively or in addition the machine may record account, name and/or time data for transactions involving suspect sheets. Of course other data which identifies the particular user of the machine and/or the transaction which has involved suspect sheets may be recorded. Such information allows later reversal of the provisional credits to be made, as well as the person involved in the transaction to be contacted concerning the particulars of the transaction reversal. Of course, it should also be understood that in cases where sheets are suspect because they are probable of being counterfeit as identified by the machine, no provisional credit is given but the transaction information is also gathered and stored. This enables the person involved in the transaction to be contacted so the machine operator may provide an explanation, and also enables law enforcement officials to locate the person involved with the transaction so that the source of the notes may be investigated.

As later discussed herein, in embodiments of the invention which include the capability of capturing images from deposited documents, images from portions of the notes may be captured and correlated with the particular transaction. This may include for example a portion of each note containing a serial number. This captured data is stored so as to enable the particular note associated with the transaction to be later identified, even though the note may not be physically segregated in the automated banking machine or other device, from other suspect or counterfeit notes.

Alternatively, in embodiments of the invention other conditions may be detected. An intermediate threshold maybe indicative of a double note which should be diverted to storage or transported for further processing to separate the notes. Embodiments of the invention may also have stored threshold values corresponding to transmission and reflectance properties for the particular type note. In some embodiments these threshold values may correspond to averages of reflectance and transmission values. Comparison of such average values for the note detected to the threshold values for the particular note type, identifies notes having the note conditions corresponding to the thresholds.

Alternative embodiments of the invention may be particularly adapted for determining the note condition with or without making a determination of the note type. In such embodiments one or several emitters direct radiation at one or more test spots on a note. The magnitudes of the reflected radiation and the transmitted radiation through the test spot are sensed with respective sensors positioned on opposite sides of the note in the note path. The signals corresponding to the reflectance and transmission values are processed together by appropriate circuitry to provide one or more values. This calculated value may then be compared to one or more threshold values which correspond to values stored in the data store. The stored values correspond to conditions of interest for which the analysis is conducted.

By way of example, a condition for which sensing may be conducted is the existence of a double note. In the case of a U.S. note of a particular type, a double condition is determined from the magnitudes of the reflectance and transmission values through one or more test spots. In the case of infrared radiation which is used for purposes of this example, the magnitude of the reflected radiation is directly related to the thickness of the note. Thus in the case of the double note the magnitude of the reflectance signal will be greater than in the case of the single note. The magnitude of the radiation transmitted through the note is inversely related to the thickness of the note. As a result the magnitude of the transmitted radiation will be greater for a single note than a double note.

The darkness of the surface of a note, which in this example is U.S. currency, affects both the magnitudes of the radiation reflected from and the radiation transmitted through a note. Specifically, darkness which may be due to color, density of printing in particular areas or a soiled condition of the note, reduces the magnitude of both the transmitted and reflected radiation in the infrared range. Likewise, wearing of the note which reduces thickness and generally results in a lessening of color, has an opposite effect in generally increasing the magnitude of both reflectance and transmission values.

In this example the conditions which produce variations in transmittance and reflectance properties may be used to establish the threshold representative of a double condition or other conditions. The circuitry employed is operative to combine the transmittance and reflectance signals, and to provide compensation for changes in color and pattern density on the face of the note from which radiation is reflected. Because a reduction in reflectance will correspond to a drop in transmittance without a change in thickness, a resulting value corresponding to the combined signal is less affected by the color and pattern on the face of the note and more sensitive to note thickness. The combined value may then be compared to one or more thresholds corresponding to a double note condition. Alternatively, the circuitry may be operative to adjust the threshold based on reflectance and/or transmission signals.

In alternative embodiments other conditions which produce variations in transmittance and reflectance properties may be used to establish thresholds corresponding to various conditions. Circuitry employed in such embodiments may determine single or multiple note conditions, as well as the existence of other conditions. This is accomplished by including in the calculation of values corresponding to the note properties and/or in comparing values corresponding to properties to thresholds that are indicative of conditions, the signals which correspond to both the magnitude of radiation reflectance from, and transmission through, test spots. In making such determinations of the existence of conditions, the transmission and reflectance values sensed may be weighted differently when combined or otherwise processed for purposes of determining a resultant value for comparison to threshold values. The approach used for processing and weighing the sensed transmission and reflectance values depends on the properties of the note types involved and the conditions that are to be determined. Threshold values may correspond to stored data values determined through experimentation and/or combinations involving stored and dynamically sensed values.

It should be appreciated that alternative embodiments that make determinations of note conditions may do so using spot sensing assemblies similar to spot sensing assemblies 18. Other embodiments may have fewer radiation emitters such as the single infrared type emitter discussed in the foregoing example. Likewise, other embodiments may have different or other types of radiation emitters and sensors. Embodiments may also be specifically adapted to determine at least one note condition without determining note type. Some embodiments may include emitters and sensors which sense transmission and reflectance properties over test spots that are either longitudinally and/or transversely elongated. These may include test spots that are elongated over substantial portions or even the entire width or length of a note. Other alternative embodiments may sense conditions only in selected regions of notes where the properties of reflectance, transmission or both, are particularly indicative of conditions to be determined. The circuitry of alternative embodiments may be operative to sum or average transmission and reflectance values as well as to apply weighting factors to such values which result from a combination thereof over one or more test spots. Finally, alternative embodiments may operate in combination with the note type determining sensors and circuitry as previously described, or may comprise separate sensors and circuitry.

A further advantage of embodiments employing aspects of the present invention is that it may provide an indication of note type that includes note orientation. This enables the present invention to be coupled with mechanisms which reorient the note and segregate notes of different denominations. This enables the notes to be collected for bundling or for dispense to a user of the machine in which the apparatus of the present invention is installed.

Embodiments of the present invention also provide capabilities for detecting counterfeit notes. This is achieved because the available data may be selectively processed by the control circuits in ways that are intended to assist in the detection of counterfeit notes. If, for example, it is known that counterfeit currency for a particular country tends to deviate significantly from actual currency either in reflection or transmission of a particular wavelength of radiation, or in a particular region of a note, the level of correlation for this particular wavelength or region of the note may be analyzed by the control circuit individually. Notes which exhibit the properties of a counterfeit may then be identified as suspect even through the overall level of correlation may be marginally acceptable. The particular properties which may distinguish a counterfeit note from a genuine note will depend on a particular currency or other document involved and its properties.

Figure 8:
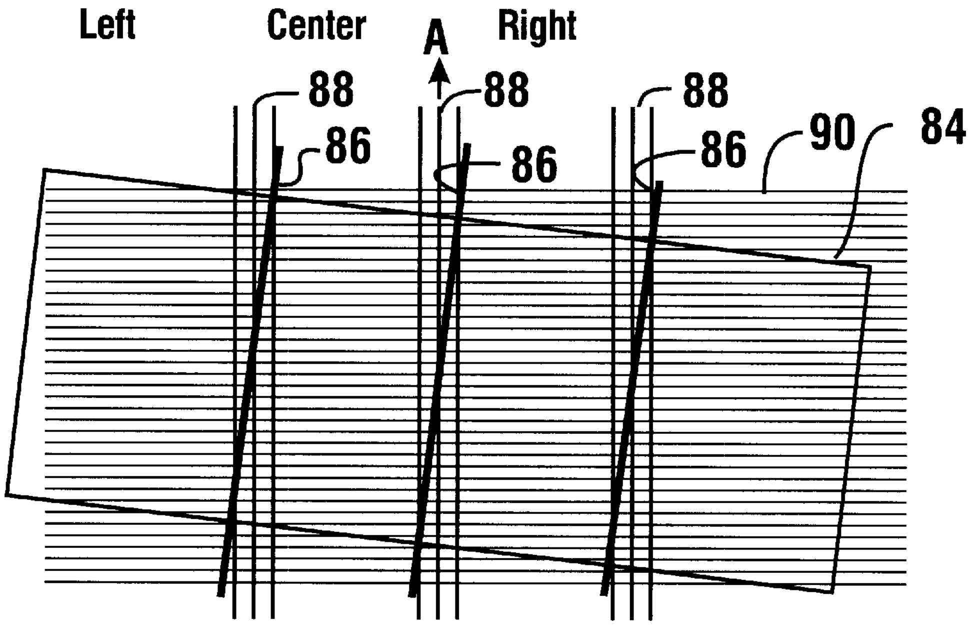
FIG. 8 is a schematic view of a note passing through the apparatus of the present invention in a skewed condition.

A further advantage of certain exemplary embodiments of the present invention is that notes passing through the apparatus need not be aligned transversely in the note path. Rather, the notes may be skewed such that one of the transverse sides is ahead of the other. An example of a note 84 that is skewed relative to the note path is shown schematically in FIG. 8. Note 84 is shown with its left side leading. Lines 86 which are superimposed on the note in FIG. 8 show the lines or grid of test spots that would be sampled if the note were aligned in the note path. Lines 88 represent the lines of test spots on the skewed note that are tested by the spot sensing assemblies. Superimposed lines 90 represent where the spot sensing assemblies sense data. Therefore, the intersections of lines 90 and 88 represent a grid of locations where data is gathered by the spot sensing assemblies as the note 84 passes.

Figure 9:
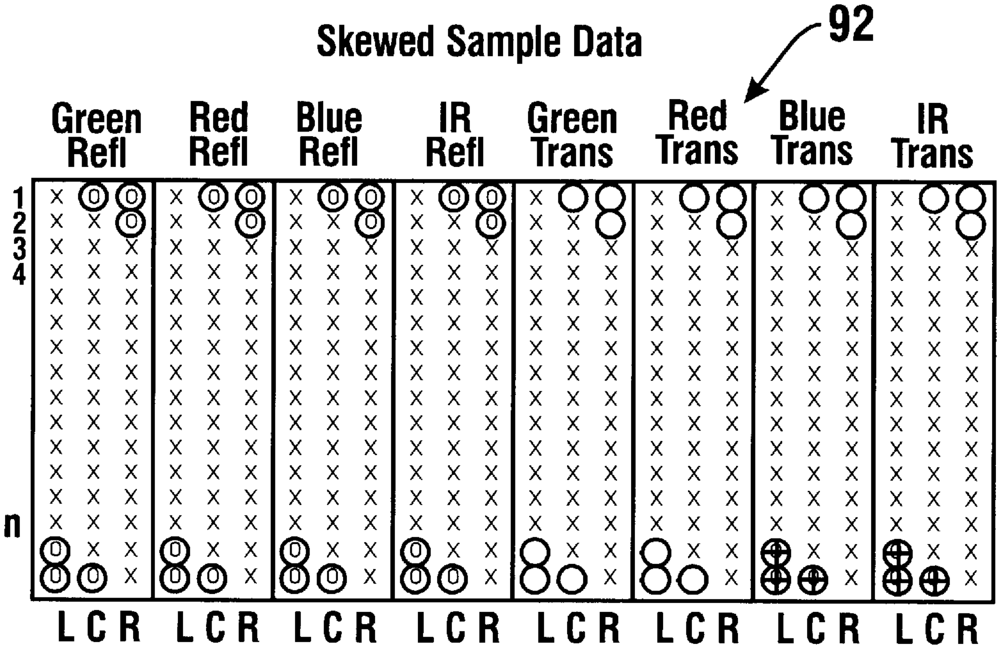
FIG. 9 is a schematic representation of data generated by the circuit of the invention responsive to signals from the spot sensing assemblies for the skewed note shown in FIG. 8.

A sensed value set 92 shown in FIG. 9 shows the matrix of raw data that is generated as note 84 passes the spot sensing assemblies of the previously described embodiment. The spot sensing assembly that is positioned toward the left in FIG. 8 begins sensing data from the note before the spot sensing assembly in the center. Further, the spot sensing assembly in the center begins sensing data before the spot sensing assembly on the right. The spot sensing assemblies that do not sense the note sense a near zero reflectance value and a large transmission value. Similarly, at the trailing portion of the note which is shown by the bottom of the raw sensed value set 92, the spot sensing assemblies stop sensing the note at different times in a manner that is essentially a mirror image of the condition at the leading edge of the note. As can be appreciated from FIG. 8, because of the skewed character of the note, the spot sensing assemblies sense data for more than 29 of the transverse lines 90. It will be recalled that 29 rows of test spots were sensed in the prior example for a non-skewed note.

To analyze this data, the control circuit 24 of the apparatus of the described embodiment of the present invention is operable to modify the raw sensed value set data 92 represented in FIG. 9 so that it is similar to other sensed value sets for transversely aligned notes. The control circuit 24 of the invention is further operative to produce stored value sets which account for the angle of skew of the note.

When a note is skewed, the control circuit 24 is first operative to modify the raw sensed value set 92 by transposing the data to eliminate the data points near the leading edge that represent the absence of a note. This involves shifting the values on the right for each type of emitter as shown in FIG. 9, upwardly so that a sensed value set is created in which the sensed note data is present in each position in the 29 rows. Such a modified sensed value set is indicated 94 in FIG. 10.

As shown in FIG. 10, by shifting the raw values, a sensed value set which is a matrix of 24 by 29 sensed values is produced. Although the data was gathered from more than 29 of the transverse lines 90 when the bill was sensed, the modified sensed value set 94 "squares up" the sensed data so that it is a similar sensed value set to a transversely aligned note.

Such "squared up" data is usable by the control circuit for purposes of checking to see if the note sensed is the proper length. If after "squaring up" the raw data the data does not correspond to the length of a proper note, an appropriate indication of a suspect note is given.

As can be appreciated from FIG. 8, the modification of raw sensed value set 92 to create sensed value set 94 does not result in a matrix of values that can be readily correlated with templates for notes that are aligned in the note path. This is because the test spots on skewed note 84 progressively move closer to the right edge of the note as the note passes. The rate at which the test spots on the note migrate toward the right is a function of the skew angle. To enable correlation of the modified sensed value set 94 with stored value sets, the control circuit 24 is operable to generate stored value sets for correlation that account for the angle of skew. This is graphically represented in FIG. 11.

FIG. 11 shows a modified sensed value set schematically indicated 96. This modified sensed value set 96 for purposes of this example can be envisioned as corresponding to a note like that in FIG. 8 where the note is skewed such that the left side in the frame of reference leads the right side. The control circuit is operable based on the calculated angle of skew of the note to take values from different sub-templates 68 in the master template 70 as graphically represented in FIG. 12.

As shown on the right in FIG. 11, the values in columns 98, 100, and 102 represent the templates similar to sub-templates 68 for a 0" horizontal offset, +⅛" horizontal offset, and 2/8" horizontal offset respectively as shown in FIG. 12. To generate a stored value set for correlation with modified sensed value set 96, the control circuit 24 is operative to select a series of values from the 0" offset template represented by column 98. The control circuit is then operative to "jump" so as to begin selecting values from column 100 which corresponds to the template 68 for the same note type transposed +⅛" from the 0" offset position. Further, after taking several values from column 100 the control circuit is operative to begin selecting values from column 102 which is representative of the template for the same note type disposed +2/8 from the 0" offset position.

The point where the control circuit 24 begins selecting values from the different templates is determined by the angle of skew. Stored value sets are generated for all positions of the note disposed within one-fourth inch of the zero reference in the note path in a similar manner.

As can be appreciated from the graphic representation in FIG. 11, to generate stored value sets that encompass the possible positions for a skewed note, the control circuit must abstract values from templates 68 for notes that are disposed more than one-fourth inch away from the zero offset position. As can now be appreciated from FIG. 12, this is why there are additional transverse offset templates 68 in each master template 70, even though the note is generally confined to an area plus or minus one-fourth inch from the zero offset position in the note path.

Figure 14:
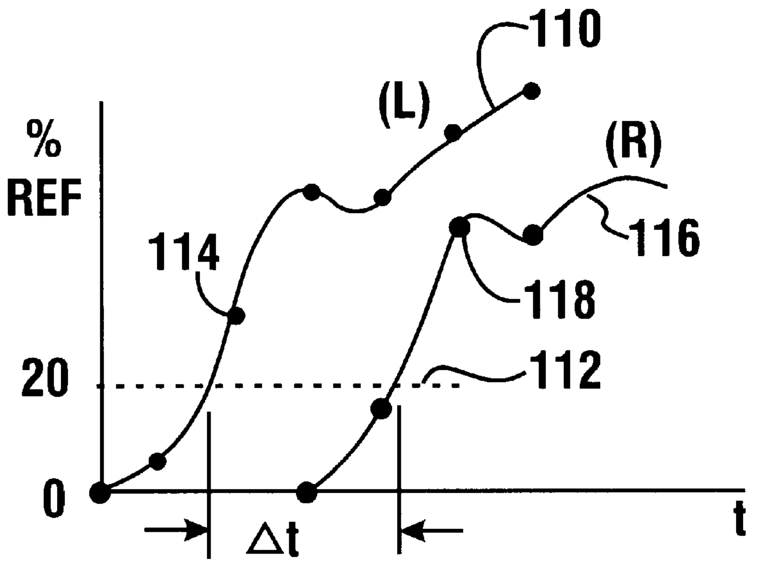
FIG. 14 is a graphical representation of reflectance signals obtained from transversely disposed spot sensing assemblies for a skewed note, which signals are used by the control circuit to determine an angle of skew.
Figure 15:
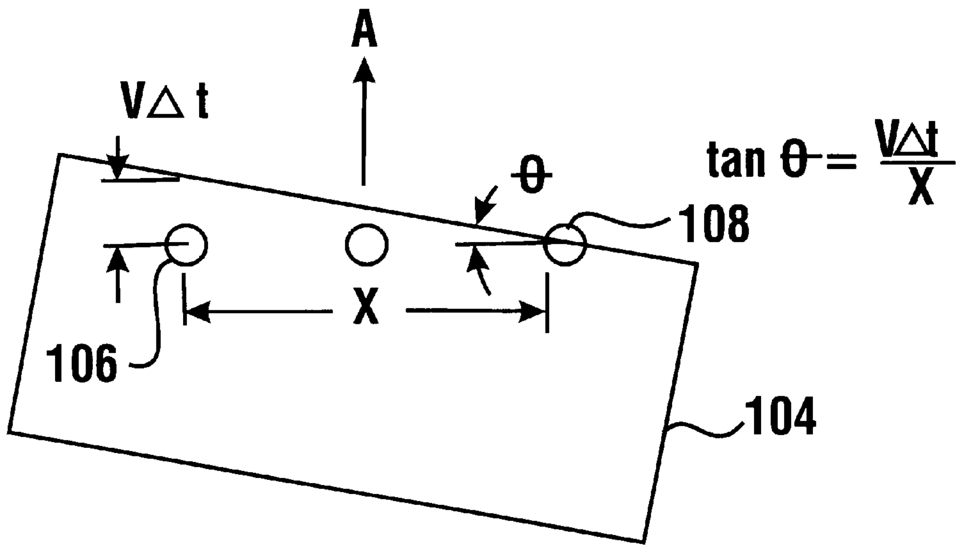
FIG. 15 is a schematic view of a skewed note and three transversely disposed spot sensing assemblies which correspond to the data graphically shown in FIG. 14.
Figure 16:
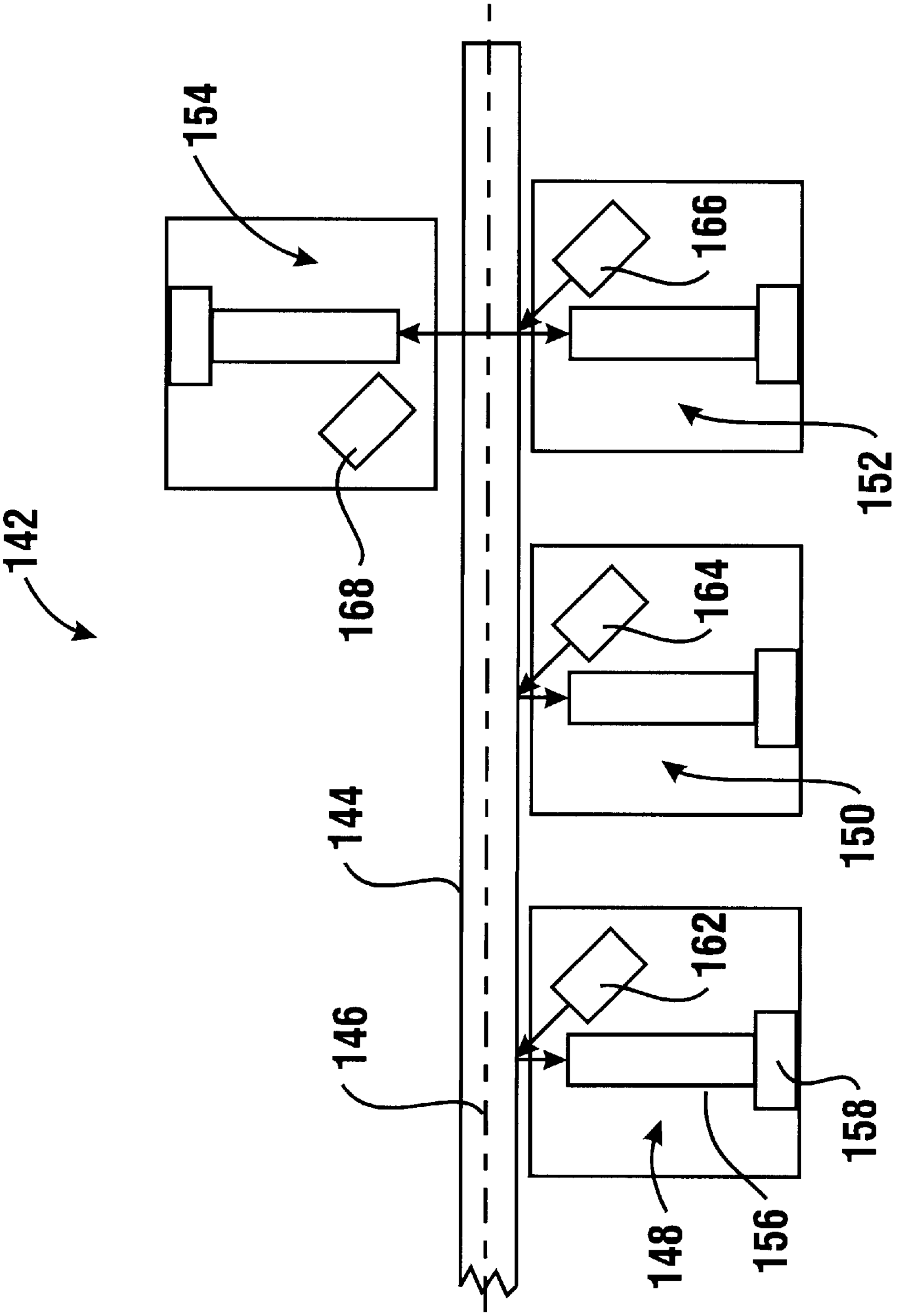
FIG. 16 is a schematic view of an alternative form of sensing assemblies for gathering reflected and transmitted radiation data from a sheet.

The calculation of the skew angle which determines how the control circuit selects or abstracts values from the various templates to produce the stored value sets, is explained with reference to FIGS. 14 and 15. FIG. 15 shows a note 104 which is skewed in a manner similar to note 84 in FIG. 8. Note 104 has a left side leading a right side in a direction of note travel indicated by Arrow A. A spot sensing assembly 106 is positioned to the left as shown in FIG. 15. A spot sensing assembly 108 is positioned to the right as shown in FIG. 16. Both of the spot sensing assemblies are the same and similar to spot sensing assemblies 18 previously discussed.

Line 110 in FIG. 15 is representative of the reflectance values for a first emitter type to have produced radiation which is reflected from note 104 in an amount above a set threshold 112. This threshold is indicated as 20 percent in FIG. 14 which has been found through experimentation to be an acceptable value for this purpose when using U.S. currency notes. Of course other threshold values may be used. Data points 114 are representative of the actual reflectance values for the particular type emitter in spot sensing assembly 106 which was the first of the emitters to produce a reflectance value above the threshold. Line 110 is produced by a curve fitting process carried out by control circuit 24 using actual data points 114. This is done through execution of known curve fitting algorithms.

Line 116 is fitted by the control circuit to data points 118. Data points 118 are representative of the actual reflectance values from the emitter type in spot sensing assembly 108 that corresponds to the emitter that produced data points 114 in spot sensing assembly 106. By comparing the times at which the lines 110 and 116 each crossed the threshold 112, the skew angle of the note may be calculated. This difference in time in which reflectance values for the same emitter type in each of the spot sensing assemblies crossed the threshold is represented by the quantity Δt in FIG. 14.

The distance between spot sensing assemblies 106 and 108 is a known fixed quantity. Similarly the speed at which the note moves on the note transport is also known. As shown in FIG. 15 the angle of skew 0 can be calculated by the following equation:

$$\tan\theta = \frac{v\Delta t}{x}$$

where:

θ is the angle of skew;

v is the velocity of the note in the note direction;

Δt is the difference in time between when the first emitter in a first spot sensing assembly senses the property of the note crossing the threshold, and when the corresponding emitter in the furthest disposed spot sensing assembly senses the property for that assembly crossing the threshold;

x is the distance between the spot sensing assemblies 106, 108 for which the time difference is evaluated.

As can be appreciated from the foregoing discussion, the angle of skew determines the points at which the control circuit begins selecting values from the templates to produce the stored value sets for comparison to the modified sensed value set. Of course, the angle of skew may be in either direction which necessitates that the control circuit be enabled to abstract values from templates 68 progressively in either transverse offset direction.

Referring again to FIG. 12 which shows the correlation sequence, step 74 is the deskewing step in which the raw sensed value set from the spot sensing assemblies like set 92 in FIG. 9 is "squared up" to produce a modified sensed value set similar to set 94 in FIG. 10. When the data is skewed this step is done to produce the sensed value set 76 in FIG. 12 for purposes of correlation.

In step 66 the stored value sets are produced by the control circuit by abstracting data from the templates 68 in each master template 70, responsive to the skew angle detected. Thus, in the example represented in FIG. 12, values are abstracted from the 0" offset template 68 and the +⅛ " offset template 68 to generate the stored value set 72 in the table of stored value sets the 0 vertical and 0" horizontal offset position.

As will be appreciated from the prior discussion, for the stored value sets 72 shown in the table above the 0 position, shifts between the two adjacent templates 68 occur one line of data higher with each −¼ step upward in the table of stored value sets. Similarly, the shift between the templates would occur one data line downward for each +¼ increment below the 0 vertical offset position in the table of stored value sets.

For example, to generate the stored value set 72 shown in the table having a 0 vertical offset and a horizontal offset position of −⅛", values on the corresponding lines highlighted in FIG. 12 in the 0" horizontal offset template, would instead be taken from the template having a horizontal offset of −⅛". Likewise, the lines shown highlighted in FIG. 12 in the +⅛ horizontal offset template, would instead be taken from the 0" horizontal offset template. Similarly, lines of data would be abstracted from these two templates by the control circuit 24 one data line upward from the values used to produce the 0, −⅛" stored value set, to generate the stored value set shown in the table at −¼", −⅛". Abstracting values from the templates two data lines upward from the values used to generate the 0, −⅛" stored value set, provides the −²⁄₄, −⅛ stored value set and so on.

Similarly abstracting values from the two templates used to produce the 0, −⅛" stored value set 72, provides the +¼, −⅛"; +²⁄₄, −⅛"; +¾, −⅛" and +⁴⁄₄, −⅛" stored values sets. This is done by abstracting values successively one data line lower than those abstracted to produce the prior stored value set.

Likewise, to produce the stored value set 72 in the 0 vertical offset, −²⁄₈ horizontal offset position, the control circuit 24 abstracts values from the −²⁄₈" and −⅛" horizontal offset templates 68, and so on. It can be appreciated that the selection process 51 executed by the control circuit 24 to generate the stored value sets for comparison with the sensed value set 76 can be visualized as a matter of shifting left-right among the templates 68 and up and down within the templates 68 to produce the various stored value sets 72 shown in the table positions in FIG. 12.

It should be remembered however, that even though values are abstracted or selected to produce the stored valued sets 72, all the selected values in a stored value set may come from a single master template 70 which corresponds to a single note denomination having a particular orientation. As a result, when the values indicating levels of correlation are calculated and the highest one is found, the stored value set which produced this highest level of correlation will correspond to only one type identity.

Figure 13:
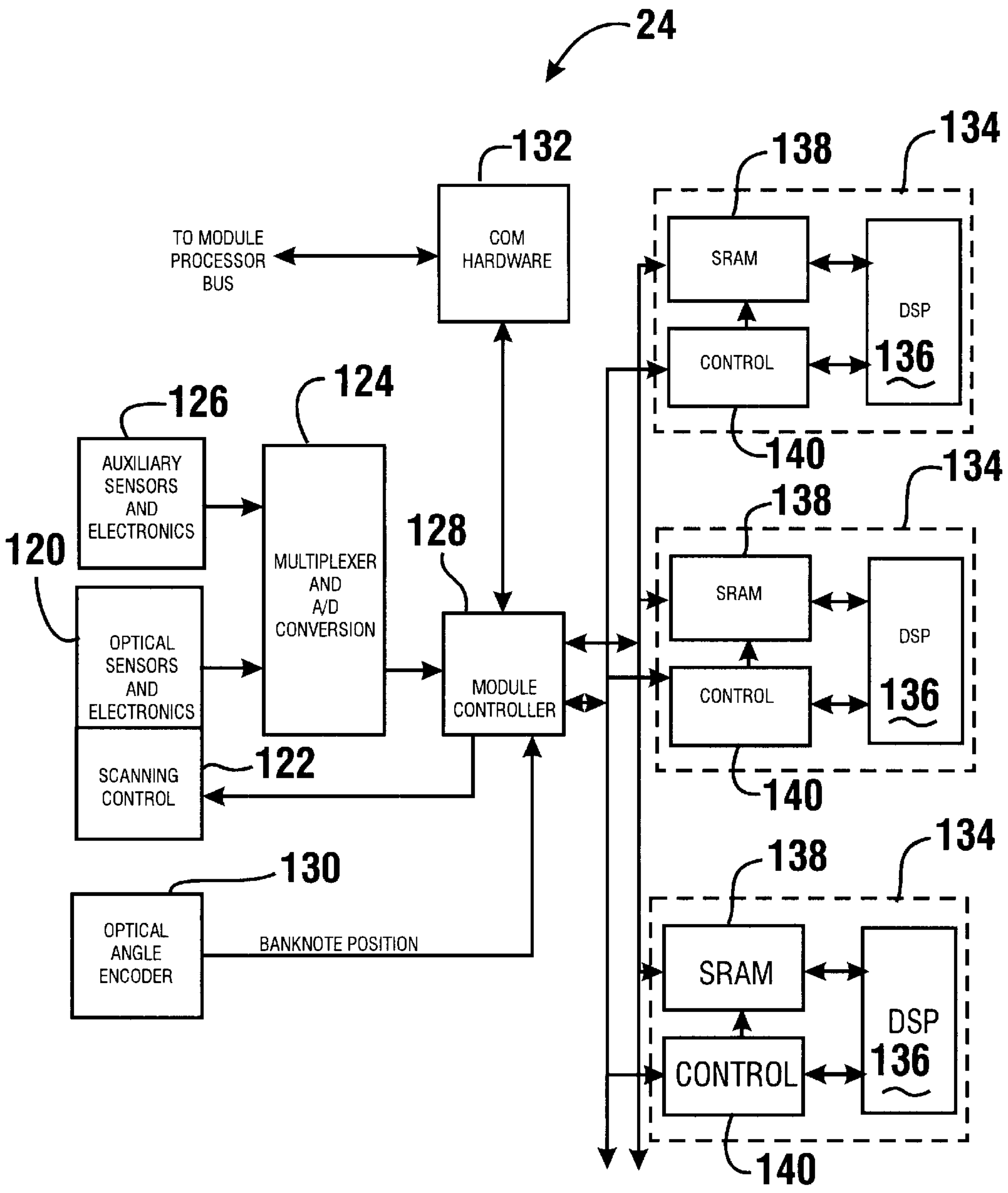
FIG. 13 is a schematic view of the control circuit of an exemplary embodiment of the present invention.

The control circuit 24 of one embodiment is schematically represented in FIG. 13. The control circuit 24 includes an optical sensors and electronics component 120. The optical sensors and electronics component includes the spot sensing assemblies 18 which produce the first and second signals which cause the control circuit 24 to generate the reflectance and transmission values.

The control circuit further includes a scanning control subassembly 122 which is in connection with the optical sensors and electronics component 120. The scanning control subassembly 122 actuates the emitters in the sequence to produce the synchronized first and second signals which correspond to each emitter type.

A multiplexer and analog to digital (A/D) converter component 124 is operative to receive the first and second signals from the spot sensing assemblies and to produce the raw reflectance and transmission values and to direct them to generate the sensed value set for each sensed note.

The exemplary control circuit 24 further includes an auxiliary sensors subassembly 126. The auxiliary sensors subassembly corresponds to the auxiliary sensors 28 previously discussed. These auxiliary sensors are preferably a type particularly tailored to the document or note type being sensed.

A module controller 128 is operative to receive data from and to control the operation of the other components of the system. The controller 128 is in connection with an angle encoder subassembly 130. The angle encoder subassembly 130 is operative to determine the skew angle of a note from the initial emitter signals as the note is sensed in the manner previously discussed. The control circuit 24 further includes a communications subassembly 132 which is operative to transmit signals to and from the controller 128. The communications subassembly transmits information to and from a larger system of which the apparatus is a part, such as other controllers in an automated banking machine. It also delivers signals to and from input and output devices.

The controller 128 is in communication with a plurality of calculator modules 134. Each calculator module 134 includes a digital signal processor 136. Each digital signal processor 136 is in operative connection with a static random access memory 138. The memories 138 hold the stored values which are used to determine the level of correlation between the sensed value set and the generated stored value sets. Each memory 138 preferably holds a different group of the master templates 70.

Each calculator module 134 further includes a calculator controller 140. The calculator controllers are operative to produce the stored value sets from the templates in the memories 138. This is done based on angle of skew data provided by the controller 128. The calculator controllers are further operative to cause their associated digital signal processor to calculate the correlation values between the data values in the sensed value set and the stored value sets. The calculator controllers are further operative to control the associated digital signal processor to calculate the overall correlation coefficient for each stored value set, and to indicate the highest correlation value for the master templates handled by the particular calculator module.

The architecture of the described form of the control circuit 24 enables rapidly carrying out large numbers of calculations which are necessary to generate the stored value sets and to determine the correlation values for the sensed value set and all the stored value sets. The control circuit 24 has the advantage that each of the digital signal processors operates in parallel on the master templates stored in its associated memory. In addition, the processing capabilities of control circuit 24 may be increased by adding additional calculator modules 134 to generate and correlate additional stored value sets. This enables correlating selective or additional sensed values with stored data.

In operation of the control circuit 24 the controller 128 operates the scanning control subassembly 122 to sequence the emitters in the spot sensing assemblies, which are included in the optical sensors and electronics subassembly 120. The first and second signals corresponding to reflectance and transmission from each emitter are delivered to the multiplexer and A/D converter 124 which delivers digital reflectance and transmission values corresponding to each emitter. The multiplexer and AID converter 124 also receives signals from the auxiliary sensors and electronics subassembly 126 and delivers appropriate signals from these to the controller 128 as well.

The controller 128 is operable to sense a note entering into proximity with the spot sensing assemblies and to produce the raw sensed value set. The angle encoder subassembly 130 is operative to determine the angle of skew from the raw sensed value set and to deliver the information to the controller 128. The controller 128 is further operative to modify the raw sensed value set and to deliver the modified sensed value set and the angle of skew data to each of the calculator modules 134.

The controller 128 is operative to determine the note length from the modified sensed value set and compare it to the length for a standard note based on the number of test spots obtained. If the sensed note does not have the proper length a signal indicative thereof is generated, and further processing for that note is not conducted or the sheet is handled differently if it is potentially a type of sheet that may be processed by the machine.

Each calculator module 134 is operative to generate stored value sets from the stored values in the master templates in memories 138 based on the angle of skew. The calculator modules are further operative to calculate the correlation coefficient values for the modified sensed value set and each of the generated stored value sets. Each calculator module stores and communicates to the controller 128 the calculated overall correlation coefficient value for each of the generated stored value sets. Each calculator module provides this information along with the data identifying the master template which was used to generate the stored value sets, to controller 128, along with other selected correlation data that the calculator modules may have been programmed to provide.

The controller is operative to receive the signals from each of the calculator modules and to determine which master template produced the highest level of correlation with the sensed value set. The controller module is further operative to determine if the correlation value which is the highest, is over a first threshold which indicates that the level of correlation is likely to be indicative of the note type associated with the particular master template.

The controller 128 then transmits signals to the communication subassembly 132 indicative of the note type identified or signals indicative that the note identified is suspect because its highest correlation level is not above the threshold.

In alternative embodiments, the controller 128 may test to determine if the correlation value exceeds other thresholds and transmit signals indicative of the fitness of the note for further use, or other signals relating to the genuineness or suspect character of the note. The communication subassembly 132 transmits signals to a communications bus connected to the apparatus of the present invention and to other devices and systems which are operative to further process the note or provide information about the note.

While in the described embodiment the control circuit 24 is adapted to performing the calculating functions required for identifying the types of notes, in other embodiments other control circuit configurations may be used. Further, in one exemplary form of the control circuit 24 the memories 138 which make up the data store may be programmed through the apparatus. This may be done in a setup mode as discussed by selectively positioning sample notes and moving them in controlled relation adjacent the spot sensing assemblies to gather the data necessary to produce the master templates.

This is done by having the module controller 128 control the operation of the note transport to move the sample notes at a speed which will enable gathering data at all the desired locations on the note. The controller 128 may also be programmed in the setup mode to receive signals indicative of the note type, and the transverse offset positions of the note used to provide template data in the memories 138 which comprise the data store.

Alternatively, the stored data may be produced in a different apparatus and loaded into the memories 138 through the controller 128 or from another source. In this approach stored values may be gathered from static analysis of sample notes.

In an exemplary embodiment the optical sensors and electronic subassembly 120 further include a compensator circuit that facilitates calibration of the spot sensing assemblies. In the exemplary form of the invention the optical sensors and electronic subassembly is calibrated using a selected standard grade of white paper which is passed through the note transport adjacent to the spot sensing assemblies. In the calibration mode the optical sensors and electronic subassembly 120 is operative to adjust the amount of radiation generated by each of the emitters to produce a preset output. This ensures that the level of radiation produced by each of the emitters is sufficient to correlate accurately with the stored value sets that are produced. Of course in other embodiments of the invention other types of reference material may be used for purposes of calibration.

Periodic calibration of the optical sensors and electronic subassembly 120 minimizes the chance that changes in the emitters over time or changes in the optical path due to accumulation of dust or other contaminants, will adversely impact the accuracy of the apparatus. Due to the nature of light emitting diodes (LEDs) used for the emitters and the nature of the control circuitry which generally responds to relative values rather than absolute values, in the exemplary embodiment calibration is required infrequently.

Figure 17:
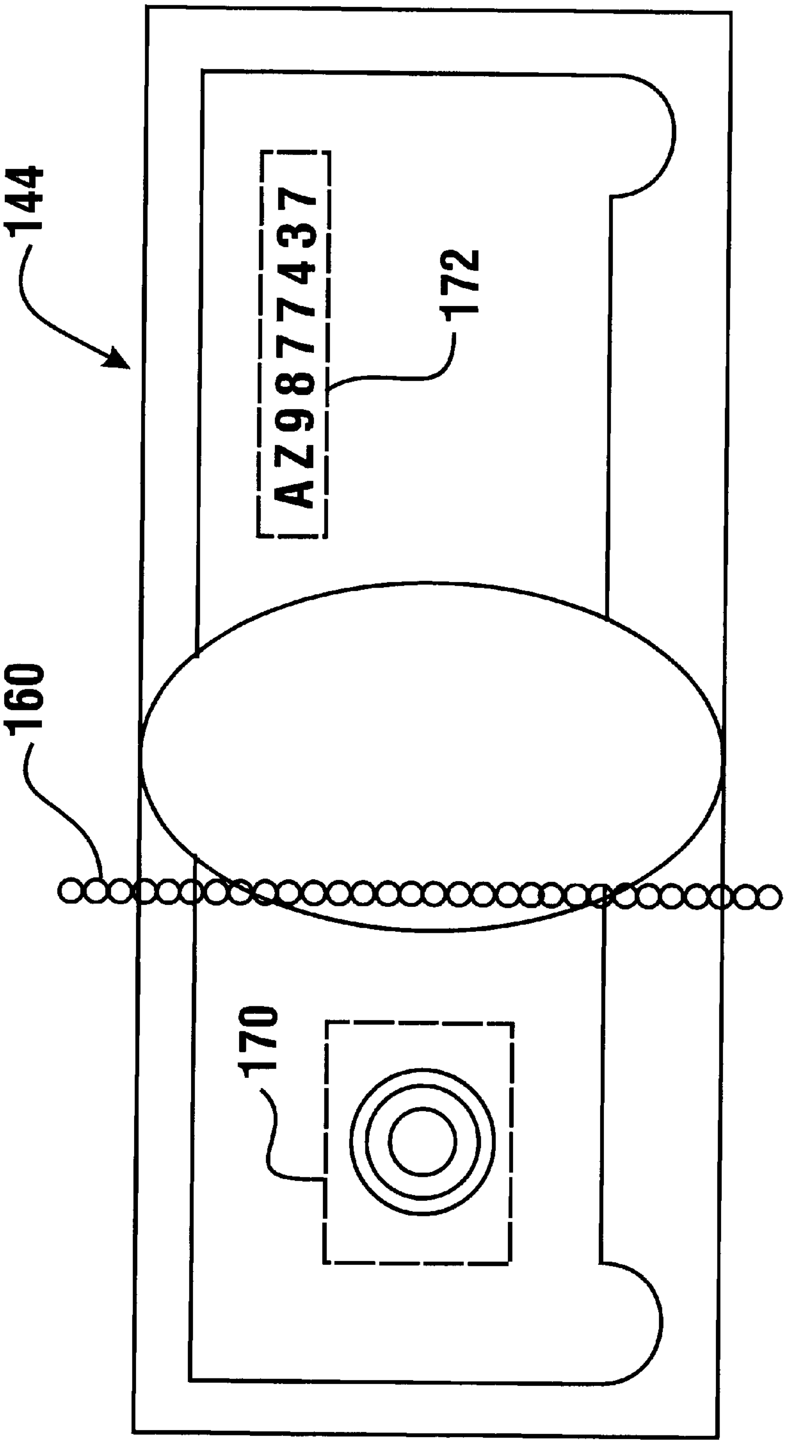
FIG. 17 is a schematic representation of a note including portions representative of watermarks which can be detected and images which may be captured and used for performing functions in embodiments of the invention.

Embodiments of the present invention may be operated using a variety of types of sensing assemblies for gathering the data sets that can be used to process sheets such as currency bills. FIGS. 16 and 17 schematically represent an alternative approach which also enables the performance of additional functions and capabilities. Such capabilities may be useful in automated banking machines which accept currency bills as well as other types of documents including instruments such as for example, checks, vouchers, certificates, tickets, wagering materials, bank drafts, traveler's checks or other documents or items that have value or other legal significance.

FIG. 16 schematically shows a sensing assembly 142. Sensing assembly 142 is shown positioned adjacent to a sheet 144 moving in a sheet path indicated 146 adjacent to the sensing assembly.

Sensing assembly 142 includes radiation detectors 148, 150, 152 and 154. In the exemplary embodiment each radiation detector includes a rod lens such as rod lens 156 associated with radiation detector 148. Each rod lens conducts radiation to an associated sensor element such as sensor element 158. The sensor elements are operative to produce signals responsive to the magnitude of radiation sensed by the radiation detector.

In the exemplary embodiment of sensing assembly 142, radiation detectors are arranged in linear arrays that extend transverse to the sheet path. In the described form of the invention, the linear array of radiation detectors are relatively closely spaced. This is represented by the exemplary linear array 160 shown superimposed on sheet 144 in FIG. 17. As schematically indicated in FIG. 17, the detectors of the exemplary linear array extend a transverse distance greater than the width of the sheet. As can be appreciated, this enables handling sheets in various transverse positions across the sheet path as well as dealing with skewed sheets in a manner similar to that discussed in connection with the prior embodiment.

In sensing assembly 142 each of the sensor elements has associated therewith a radiation emitter. The radiation emitter 162 is positioned adjacent to radiation detector 148 and directs radiation to test spots on a sheet adjacent thereto. Similarly an emitter 164 illuminates test spots adjacent to radiation detector 150. An emitter 166 emits radiation to test spots on the sheet adjacent to radiation detector 152. As schematically represented in FIG. 16, each of emitters 162, 164 and 166 produce radiation that is reflected from the adjacent areas on the sheet to the associated radiation detector. This produces signals indicative of reflectance values from the surface of the note which signals may be processed and correlated in a manner similar to that discussed in connection with the previously described embodiment for purposes of determining the note type associated with sheet 144.

In the embodiment shown radiation detector 154 is positioned on an opposed side of the sheet path from emitter 166 and is positioned to sense radiation transmitted through the sheet from emitter 166. As represented in FIG. 16 when sensing transmission values from emitter 166, the emitter

168 associated with radiation detector 154 will generally not be operated as it may interfere with the acquisition of the transmission data for radiation passing through the sheet. In an exemplary embodiment of the invention, the radiation detectors and associated emitters are part of contact image sensors such as those commercially available from Mitsubishi and Rohm Corporation. Such contact image sensors are relatively economical to use and include linear arrays of sensors which may be fairly closely spaced. For example in some embodiments contact image sensors may have 300 sensors per lineal inch of width along the linear array. Of course not all of the sensors need to be used in embodiments of the invention, and test spots may be relatively closer or more widely spaced depending on the needs of the particular analysis being conducted.

It should be understood that while in FIG. 16 only three sets of linear arrays of reflectance sensors and one set comprising a linear array of transmission sensors are shown, embodiments of the invention may include various types and numbers of such emitters and sensors. For example an embodiment of the invention may include four sets of linear arrays with emitters for radiation at the wavelengths mentioned in the first described embodiment and with detectors positioned to sense radiation that is reflected from the various test spots, as well as radiation transmitted through the various test spots. The data gathered may be used to produce sensed value sets as in the prior embodiment from each of the sensors. This data can be processed and manipulated in a similar manner for purposes of determining a type of currency bill, properties associated with the conditions of bills as well as for identifying counterfeit or suspect sheets. As can be appreciated, the fact that in FIG. 16 the sensors (and associated emitters) are spaced along the direction of sheet movement, and use separate detectors for each emitter, does not change the general nature of the sensed value sets that are produced. The edges of sheets passing associated detectors may be used for purposes of manipulating the data in the associated at least one computer or other circuitry, for purposes of detecting the edges of sheets and for achieving the correlation of sensed value sets with stored value sets for known sheet types. As can be appreciated, because each array of sensors has a separate associated emitter, in some embodiments emitters may remain on continuously as sheets move relative to the sensors. This may have advantages in providing a stable radiation source and in compensating for changes in emitters over time.

In addition or in the alternative emitter types used in embodiments of the invention may include nonvisible radiation, such as infrared or ultraviolet radiation. Certain types of currency bills have unique infrared and/or ultraviolet profiles which make such bills more difficult to counterfeit. Recently introduced forms of U.S. currency bills are examples of bills having such properties. Embodiments of the invention which produce ultraviolet and/or infrared radiation may be operated to compare sets of sensed value data to stored value sets which represent infrared profile data and/or ultraviolet profile data for different types of currency. Such comparisons may be made in a manner similar to that previously discussed for purposes of making determinations concerning whether sensed bills are genuine and to provide at least one output indicative thereof.

A further advantage of using closely spaced radiation detectors is that selected portions of a sheet which are known to have certain security features may be analyzed in greater detail and in many more test spots. In this way determinations concerning sheets may be made without having to conduct the number of calculations that would be required to do such a detailed analysis over the entire sheet. Additionally or in the alternative, particular areas of a currency bill or other sheet where properties of known counterfeits are found can likewise be analyzed in great detail for purposes of making a determination concerning whether the sheet is genuine. Embodiments of the invention may also be used for purposes of detecting non-visible dyes or other substances that are detectable when exposed to certain types of radiation. This may include dyes associated with marked money, blood or other substances. In some embodiments fingerprints may also be sensed and read from certain sheet types.

In embodiments of the invention other types of radiation may be used for analyzing currency bills and other sheets. For example radiation within the visible range can be analyzed for purposes of transmission or reflectance properties through portions of a sheet for purposes of comparing to visible range profiles comprised of stored value sets. Such analysis may be used for purposes of determining the genuineness or properties of a sensed sheet. It has been determined that radiation in the visible range and particularly radiation in the yellow/green range is useful for detecting watermarks in sheets. Such radiation when transmitted through a sheet provides data which can be used for determining the presence and proper configuration of a watermark. As schematically represented in FIG. 17, portion 170 of sheet 144 includes a watermark. By using the embodiment of the invention shown in FIG. 16, numerous test spot values can be obtained for transmission and reflectance properties in the area of the watermark. These values can be compared in a manner similar to that previously discussed for purposes of verifying the presence and configuration of the watermark, as well as for making a determination as to the genuineness thereof and thus the genuineness of the sheet. Such watermark detection features can be used in combination with other types of analysis discussed herein for purposes of more reliably distinguishing between acceptable and unacceptable sheets.

Another useful aspect of embodiments of the invention which use closely spaced detectors is the ability to capture data corresponding to images on documents which pass adjacent to the sensing assembly 142. For example in systems where the number of test spots which can be evaluated is high, the reflectance data generated is sufficiently detailed to produce image data that may correspond to the appearance of the bill in a particular portion of interest. An image of interest for example may include a serial number that appears on a bill as is represented by portion 172 in FIG. 17. Operating the sensing assembly responsive to one or more computers enables capturing and analyzing image data so that serial number or other images in selected portions of sheets may be determined or stored and recovered in accordance with the programming of the computer. This can be valuable in a number of different situations.

For example in the operation of an automated banking machine that receives currency notes, there will be circumstances when notes are determined to be suspect. In such circumstances the computer may be operated to capture the image data. Circumstances when the notes are suspect may include when the note is determined to be counterfeit or when the note has sufficient indicia of genuineness, but has such properties which indicate that it should be checked to determine if it may be counterfeit. In such circumstances the computer may operate to capture and store image data from the note such as the serial number so that it is known which particular notes were determined to be suspect and the basis therefor. This image data may be stored in correlated relation by the computer with other information concerning the transaction. This may include for example information corresponding to the person conducting the transaction, their accounts, time and date of the transaction and other information that is useful for purposes of documenting the transaction. This stored information may be then later recovered and correlated with the particular bills or sheets involved so that appropriate action may be taken. Such appropriate action may include for example contacting the person who has input counterfeit bills for purposes related to investigation of the source of such bills. Similarly in cases where bills which have been preliminarily identified as genuine are later proven to be counterfeit, the information may be used for notifying the person and reversing the transaction as well as for investigatory purposes. The particular information gathered and the use thereof will depend on the particular types of sheets involved, the available information and the capabilities of the particular system.

Alternative situations in which image data may be used is for example in tracking bills that have been dispensed from an automated banking machine. For example in circumstances where an individual receiving currency from an automated banking machine is believed to be involved in criminal activities, the serial numbers of bills provided to such individual may be recorded along with other information. Such information may then be used for correlation with other data subsequently received where such bills have been transported or redeemed for goods or services. Such information may be useful in investigating criminal activities. Alternatively image data may be used for tracking the effectiveness of certain activities. For example in circumstances where an automated banking machine has been installed in a facility which sells goods or services, it may be helpful to know the extent to which funds dispensed from the machine are spent for goods or services at the facility. By tracking serial numbers of bills dispensed from the machine, as well as serial numbers of bills spent by customers at the facility, the usage and value to the particular facility of having the machine therein can be made. Of course numerous other uses for capturing and/or tracking visible or nonvisible image data on bills and other types of sheets may be made.

A further advantage of the alternative sensing assembly 142 in some embodiments may be the ability to capture image data from types of documents other than currency bills. For example automated banking machines may accept instruments of the types previously discussed. For example automated banking machines may be used for check cashing transactions. An example of such a machine is shown in published International Application WO99/28870 published Jun. 10, 1999, the disclosure of which is incorporated herein by reference as if fully rewritten. In automated banking machines which accept instruments, an imaging device may be used for purposes of capturing images from portions of instruments accepted or processed by the machine.

In the case of sensing assembly 142 which includes relatively closely spaced detector elements, corresponding images from portions of instruments may be captured, analyzed and stored by one or more computers. This may include for example in the case of a check, capturing image data corresponding to a serial number such as the check number associated with a check. Other image data captured may include amounts such as a courtesy amount which indicates the amount of a check. Other image data which is captured may include data corresponding to a signature such as the cursive signature of the maker of the check and/or the signature of the person cashing the check. Coding on the check such as MICR coding or holograms may also be captured and analyzed. Such analysis may be done selectively from portions of the instrument where such data is expected to appear based on information stored in computer memory. Alternatively image data corresponding to an entire face or both faces of a check or other instrument may be captured and analyzed in the machine.

Image data captured from checks or other instruments may be analyzed through operation of a computer to produce data which can be recognized and used for conducting financial transactions at an automated banking machine. For example Check Solutions Company of Memphis, Tenn. provides commercially available software which can be used for reading numerous types of characters and handwritten signatures, and providing output signals indicative of such characters. Processing such data through one or more computers enables the conduct of check cashing transactions or other types of transactions involving instruments at automated banking machines.

In an exemplary embodiment, the single sensing assembly 142 is usable to determine a type including genuineness of currency bills, as well as to process instruments for purposes of conducting check cashing and other transactions involving receipt or delivery of instruments. In embodiments of the invention, the nature of the sheet that is being received or delivered may be determined through inputs to the automated banking machine concerning the type of transaction to be conducted. This may be done for example through inputs by a customer through the input devices on the automated banking machine. This will enable the computer or computers in operative connection with the sensing assembly to operate to analyze the sensed sheet in accordance with the particular type of instrument the customer has indicated that they would be providing to or receiving from the machine. In alternative embodiments the computer or other control circuitry associated with the sensing assembly may be operative to determine from the data sensed the particular type of sheet that is being processed through the machine. This may be done in a manner like that previously discussed as used in determining the type of bank note moved in a transport path. Further embodiments of the invention may have the capability to move a sheet repeatedly through the transport path. This may be done by reversing direction or in some embodiments by making multiple passes in the same direction past the sensing assembly as accomplished in the automated banking machine described in the incorporated disclosures. Of course other alternative approaches may be used for purposes of determining the character of a sensed sheet and analyzing its properties.

As can be appreciated from the foregoing description, exemplary embodiments of the apparatus of the present invention present the advantage that they are capable of identifying notes or other types of sheets that are presented in any orientation. Embodiments may further operate to identify notes or other sheets at high speed and without the need to have the notes precisely aligned or positioned with respect to a frame of reference.

The described embodiments of the present invention further have the advantage of being readily adaptable to different types of currency notes or other document types, and can be used to detect suspect or counterfeit notes. Exemplary forms of the present invention are also readily adaptable to different types of notes, and may be programmed to simultaneously identify notes from different countries which have different properties and which are different sizes. Further, due to the data available, forms of the present invention may be programmed to analyze certain sensed values in greater detail and/or to detect or to point out characteristics or conditions that may be associated with double, unsuitably worn or counterfeit notes, or other sheet types.

The exemplary embodiments of the present invention further present the advantages in being rapidly configured, programmed, readily calibrated, does not require frequent adjustment, and have other useful characteristics.

Thus, the apparatus and method of the present invention achieves the above stated objectives, eliminates difficulties encountered in the use of prior devices and systems, solves problems, and attains the desirable results described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations given herein are by way of examples and the invention is not limited to the exact details shown or described.

In the following claims, any feature described as a means for performing a function shall be construed as encompassing any means known to those skilled in the art to be capable of performing the recited function and shall not be deemed limited to the particular means shown as performing the recited function in the foregoing description, or mere equivalents thereof.

Having described the features, discoveries, and principles of the invention, the manner in which it is constructed and operated and the advantages and useful results attained; the new and useful elements, arrangements, parts, combinations, systems, equipment, operations, methods, processes, and relationships are set forth in the appended claims.

I claim:

1. An automated banking machine apparatus comprising:

a sheet path, wherein sheets including instruments and currency bills pass through the sheet path;

a sensing assembly adjacent the sheet path, wherein the sensing assembly is operative to sense radiation that is at least one of reflected from and transmitted through, a sheet in the sheet path;

at least one computer in operative connection with the sensing assembly, wherein the at least one computer is operative when the sheet is a currency bill to determine a type associated with the currency bill, wherein when the sheet is an instrument the at least one computer is operative to capture image data corresponding to at least one image from the instrument, and wherein the at least one computer is operative to simultaneously store a plurality of captured image data.

2. The apparatus according to claim 1 wherein the sensing assembly is operative to sense radiation that is both reflected from and transmitted through a sheet in the sheet path.

3. The apparatus according to claim 1 wherein the computer is operative when the sheet is a currency bill to determine the type responsive to stored values in a data store in operative connection with the computer corresponding to at least one of transmission and reflection properties of a plurality of bill types.

4. The apparatus according to claim 1 wherein the sensing assembly includes at least one linear array of radiation detectors.

5. An automated banking machine apparatus comprising:

a sheet path, wherein sheets including instruments and currency bills pass through the sheet path;

a sensing assembly adjacent the sheet path, wherein the sensing assembly is operative to sense radiation that is at least one of reflected from and transmitted through, a sheet in the sheet path, wherein the sensing assembly includes at least one linear array of radiation detectors, and wherein the at least one linear array extends generally transverse of a direction of sheet movement in the sheet path;

at least one computer in operative connection with the sensing assembly, wherein the at least one computer is operative when the sheet is a currency bill to determine a type associated with the currency bill, and wherein when the sheet is an instrument the at least one computer is operative to capture data corresponding to at least one image from the instrument.

6. An automated banking machine apparatus comprising:

a sheet path, wherein sheets including instruments and currency bills pass through the sheet path;

a sensing assembly adjacent the sheet path, wherein the sensing assembly is operative to sense radiation that is at least one of reflected from and transmitted through, a sheet in the sheet path, wherein the sensing assembly comprises a plurality of linear arrays of radiation detectors, wherein each linear array has at least one associated radiation source, wherein each linear array detects radiation that is at least one of reflected from and transmitted through, the sheet from the associated radiation source, and wherein each of the plurality of associated radiation sources generates radiation of a different wavelength;

at least one computer in operative connection with the sensing assembly, wherein the at least one computer is operative when the sheet is a currency bill to determine a type associated with the currency bill, and wherein when the sheet is an instrument the at least one computer is operative to capture data corresponding to at least one image from the instrument.

7. The apparatus according to claim 6 wherein at least one associated emitter produces ultraviolet radiation.

8. The apparatus according to claim 7 wherein the data store includes data representative of at least one ultraviolet profile corresponding to at least one of transmission and reflection of ultraviolet radiation for at least one sheet type, and wherein the computer is operative to compare the radiation properties sensed through the linear array associated with the ultraviolet emitter to the at least one ultraviolet profile.

9. The apparatus according to claim 8 wherein the ultraviolet profile corresponds to reflection of ultraviolet radiation from at least a portion of a type of currency bill, and wherein when the sheet is a currency bill a computer is operative to produce at least one output responsive to a result of the comparison.

10. The apparatus according to claim 6 wherein at least one associated emitter produces infrared radiation.

11. The apparatus according to claim 10 wherein the data store includes data representative of at least one infrared profile corresponding to at least one of transmission and reflectance of infrared radiation for at least one sheet type, and wherein the computer is operative to compare radiation properties sensed through the linear array associated with the infrared emitter to the at least one infrared profile.

12. The apparatus according to claim 11 wherein the infrared profile corresponds to reflection of infrared radiation from at least a portion of a type of currency bill, and wherein when the sheet is a currency bill the computer is operative to produce at least one output responsive to a result of the comparison.

13. The apparatus according to claim 6 wherein at least one associated emitter produces radiation that is in the range of visible light.

14. The apparatus according to claim 13 wherein the data store includes data representative of at least one visible range profile corresponding to at least one of transmission and reflection of radiation within the visible range for at least one sheet type, and wherein the computer is operative to compare the radiation properties sensed through the linear array associated with the visible range emitter to the at least one visible range profile.

15. The apparatus according to claim 14 wherein the visible range profile corresponds to a watermark on at least a portion of a type of sheet, and wherein the computer is operative to produce at least one output responsive to the comparison.

16. The apparatus according to claim 14 wherein the visible range profile corresponds to transmission of visible range radiation through at least a portion of the currency bill, and wherein when the sheet is a currency bill the computer is operative to produce at least one output responsive to the result of the comparison.

17. The apparatus according to claim 16 wherein the portion of the type currency bill includes a watermark.

18. The apparatus according to claim 6 wherein the sensing assembly comprises at least one contact image sensor, wherein the contact image sensor includes the linear array.

19. The apparatus according to claim 18 wherein the sensing assembly includes a pair of contact image sensors in generally facing relation on opposed sides of the sheet path.

20. The apparatus according to claim 19 wherein a first linear array in a first of the pair is operative to sense radiation reflected by the sheet from a first radiation source associated with the first linear array, and wherein a second linear array in the second pair is operative to sense radiation transmitted through the sheet from the first radiation source.

21. The apparatus according to claim 5 wherein the sensing assembly includes a plurality of linear arrays spaced from one another in the direction of sheet movement.

22. The apparatus according to claim 21 wherein each of the plurality of linear arrays has at least one associated radiation source, wherein each linear array detects radiation that is detected from the sheet from the associated radiation source.

23. The apparatus according to claim 22 wherein each of the plurality of associated radiation sources generates radiation of a different wavelength.

24. The apparatus according to claim 22 and further comprising at least one first linear array having at least one first associated radiation source, wherein the at least one first linear array is operative to sense radiation transmitted from the at least one first associated radiation source that is transmitted through the sheet.

25. The apparatus according to claim 23 wherein at least one of the radiation sources generates ultraviolet radiation.

26. The apparatus according to claim 23 wherein at least one of the radiation sources generates infrared radiation.

27. The apparatus according to claim 23 wherein at least one of the radiation sources generates radiation in the range of visible radiation.

28. The apparatus according to claim 4 wherein a first radiation detector in a first linear array detects radiation transmitted through a test spot on the sheet, and a second radiation detector in a second linear array detects radiation transmitted through the test spot.

29. The apparatus according to claim 28 wherein when the sheet is a currency bill the computer is operative to determine the type of the currency bill responsive to data stored in at least one data store in operative connection with the computer, corresponding to transmission and reflection properties adjacent the test spot for each of a plurality of types of currency bills.

30. The apparatus according to claim 1 wherein when the sheet type is a currency bill the computer is operative to cause the sensing assembly to capture data corresponding to at least one image.

31. The apparatus according to claim 30 wherein the image includes at least one number on the currency bill.

32. The apparatus according to claim 31 wherein the computer is operative to correlate the at least one number with data corresponding to a transaction at the automated banking machine.

33. The apparatus according to claim 32 wherein the at least one number includes at least a portion of a serial number on the bill.

34. The apparatus according to claim 30 wherein the computer is operative to determine that the currency bill is a suspect type, and wherein the data corresponding to the at least one image is captured responsive to determination that the currency bill is the suspect type.

35. The apparatus according to claim 1 wherein when the sheet is an instrument the at least one image includes a serial number.

36. The apparatus according to claim 1 wherein when the sheet is an instrument the at least one image includes an amount.

37. The apparatus according to claim 1 wherein when the sheet is an instrument the at least one image includes a signature.

38. An automated banking machine apparatus comprising:

a path,
  wherein the path is adapted to have currency bills pass therethrough,
  wherein the path is adapted to have instruments pass therethrough, wherein the instruments differ from currency bills, an arrangement,
  wherein the arrangement includes at least one computer in operative connection with a radiation sensing assembly, wherein the computer is in operative connection with a data store, wherein the radiation sensing assembly is adjacent the path,
  wherein the arrangement is operative to determine at least one of currency bill denomination and currency bill validation,
    wherein the radiation sensing assembly is operative to sense radiation associated with a currency bill,
      wherein the determination is responsive to at least one stored value in the data store corresponding to sensed currency bill radiation,
  wherein the arrangement is operative to retrievably store image data representative of at least one image from an instrument,
    wherein the radiation sensing assembly is operative to sense radiation associated with the instrument,
      wherein the image data corresponds to the sensed instrument radiation,
  wherein the arrangement is operative to retrieve a stored plurality of image data.

39. The apparatus according to claim 38 wherein the arrangement is operative to determine both currency bill denomination and validation.

40. The apparatus according to claim 38 wherein the arrangement is operative to retrievably store image data representative of at least one image from a currency bill, wherein the radiation sensing assembly is operative to sense radiation associated with the currency bill, and wherein the image data corresponds to the sensed currency bill radiation.

41. The apparatus according to claim 38 wherein at least one instrument comprises a financial check, and wherein the arrangement is operative to retrievably store image data representative of at least one image from a financial check along with other image data.

42. An automated banking machine comprising:

a path, wherein currency bills and financial checks pass through the path;

at least one sensing assembly adjacent the path, wherein the at least one sensing assembly is operative to sense radiation that is at least one of reflected from and transmitted through bills and checks in the path;

at least one computer in operative connection with the at least one sensing assembly and at least one data store, wherein the at least one computer is operative responsive to radiation sensed by the at least one sensing assembly and data in the at least one data store to determine a denomination associated with a bill in the path and to capture image data corresponding to at least one image on a check in the path and to cause the image data to be stored in the at least one data store.

43. A method comprising:

a) passing sheets comprising currency bills and checks through a path in an automated banking machine;

b) sensing radiation that is at least one of transmitted through and reflected from bills and checks passed through the path with at least one sensing assembly adjacent the path;

c) determining through operation of at least one computer responsive to radiation sensed by the at least one sensing assembly, a denomination associated with a bill passed through the path;

d) storing in a data store through operation of the at least one computer responsive to radiation sensed by the at least one sensing assembly, image data corresponding to at least one image on a check passed through the path.

* * * * *

UNITED STATES PATENT AND TRADEMARK OFFICE

CERTIFICATE OF CORRECTION

PATENT NO. : 6,573,983 B1
DATED : June 3, 2002
INVENTOR(S) : Edward Laskowski

It is certified that error appears in the above-identified patent and that said Letters Patent is hereby corrected as shown below:

Title page,
Item [75], Inventors, should read -- H. Thomas Graef --

Signed and Sealed this

Twenty-eighth Day of September, 2004

JON W. DUDAS
*Director of the United States Patent and Trademark Office*